(12) United States Patent
Glasser

(10) Patent No.: US 11,681,004 B2
(45) Date of Patent: *Jun. 20, 2023

(54) FALSE POSITIVE IMMUNITY IN BEACON SYSTEMS, AND RELATED SYSTEMS, METHODS, AND DEVICES

(71) Applicant: Listen Technologies Corporation, Bluffdale, UT (US)

(72) Inventor: Lance Glasser, Saratoga, CA (US)

(73) Assignee: Listen Technologies Corporation, Bluffdale, UT (US)

(*) Notice: Subject to any disclaimer, the term of this patent is extended or adjusted under 35 U.S.C. 154(b) by 178 days.

This patent is subject to a terminal disclaimer.

(21) Appl. No.: 17/206,984

(22) Filed: Mar. 19, 2021

(65) Prior Publication Data

US 2022/0128643 A1    Apr. 28, 2022

Related U.S. Application Data

(63) Continuation of application No. 17/080,537, filed on Oct. 26, 2020, now Pat. No. 10,989,783.

(51) Int. Cl.
| | |
|---|---|
| *G01S 1/02* | (2010.01) |
| *G06N 20/00* | (2019.01) |
| *H04W 4/02* | (2018.01) |
| *G01S 1/06* | (2006.01) |

(52) U.S. Cl.
CPC ............... *G01S 1/022* (2013.01); *G01S 1/06* (2013.01); *G06N 20/00* (2019.01); *H04W 4/023* (2013.01)

(58) Field of Classification Search
CPC .......... G01S 1/022; G01S 1/06; G01S 1/0428; G01S 1/68; G01S 5/0295; G06N 20/00; H04W 4/023; H04W 4/021

USPC ....................................................... 455/456.1
See application file for complete search history.

(56) References Cited

U.S. PATENT DOCUMENTS

| | | | |
|---|---|---|---|
| 7,755,360 B1 * | 7/2010 | Martin ................... | G01R 19/00 324/67 |
| 8,264,226 B1 | 9/2012 | Olsson et al. | |
| 8,635,023 B2 | 1/2014 | Friedler et al. | |
| 8,806,653 B2 * | 8/2014 | Di Rienzo .......... | H04L 63/0428 340/988 |
| 8,965,688 B2 * | 2/2015 | Bandyopadhyay .... | G01C 17/38 701/1 |
| 9,286,776 B1 | 3/2016 | Morton | |
| 9,949,226 B1 | 4/2018 | Sun et al. | |
| 9,955,303 B2 | 4/2018 | Baker | |

(Continued)

FOREIGN PATENT DOCUMENTS

| | | | | |
|---|---|---|---|---|
| CA | 2864619 A1 * | 8/2013 | ....... | G06F 17/30002 |
| CN | 106664530 A | 5/2017 | | |

(Continued)

*Primary Examiner* — Mahendra R Patel
(74) *Attorney, Agent, or Firm* — TraskBritt

(57) ABSTRACT

Disclosed embodiments relate, generally, to beacon systems where a locator beacon is used as a marker for a location of interest, and improving false positive immunity in such beacon systems. Confiner beacons are included in such beacon systems to confine a triggering area for triggering a location indication for a location of interest marked by a locator beacon. In other embodiments, arbitrarily shaped triggering areas are defined using confiner beacons. In other embodiments, errant locator signals are identified and handled (e.g., ignored).

32 Claims, 16 Drawing Sheets

(56) References Cited

U.S. PATENT DOCUMENTS

| | | | |
|---|---|---|---|
| 9,967,711 B1 | 5/2018 | Cannings | |
| 11,058,301 B2* | 7/2021 | Yang | A61B 5/0073 |
| 2011/0210843 A1 | 9/2011 | Kummetz | |
| 2013/0336138 A1* | 12/2013 | Venkatraman | G01S 5/0278 |
| | | | 370/252 |
| 2014/0376453 A1 | 12/2014 | Smith | |
| 2015/0099539 A1 | 4/2015 | Titus et al. | |
| 2015/0119079 A1 | 4/2015 | Tarlazzi et al. | |
| 2015/0350174 A1 | 12/2015 | Reno et al. | |
| 2016/0127664 A1* | 5/2016 | Bruder | G01S 5/16 |
| | | | 356/614 |
| 2016/0183042 A1 | 6/2016 | Weizman et al. | |
| 2016/0219405 A1 | 7/2016 | Mishra et al. | |
| 2016/0275579 A1 | 9/2016 | Pike et al. | |
| 2016/0334498 A1* | 11/2016 | Jamieson | G01S 5/02213 |
| 2016/0353246 A1* | 12/2016 | Elias | G01C 21/20 |
| 2018/0124234 A1 | 5/2018 | Covington et al. | |
| 2018/0295471 A1 | 10/2018 | Dewan | |
| 2018/0367948 A1 | 12/2018 | Bottazzi | |
| 2019/0052995 A1 | 2/2019 | Agrawal et al. | |
| 2020/0150213 A1* | 5/2020 | Oh | G01S 5/14 |
| 2021/0254056 A1* | 8/2021 | Liu | G16B 20/50 |

FOREIGN PATENT DOCUMENTS

| | | | | |
|---|---|---|---|---|
| EP | 3862852 A1 * | 8/2021 | | G06F 1/163 |
| WO | WO-0057137 A1 * | 9/2000 | | G01B 11/002 |
| WO | 2017/098534 A1 | 6/2017 | | |
| WO | 2018/024527 A1 | 2/2018 | | |
| WO | WO-2018204019 A1 * | 11/2018 | | G05D 1/0246 |
| WO | WO-2019064062 A1 * | 4/2019 | | B60S 1/02 |
| WO | WO-2019226691 A1 * | 11/2019 | | G06F 3/012 |

\* cited by examiner

Body-Centered Cubic Structure

FALSE POSITIVE IMMUNITY IN BEACON SYSTEMS, AND RELATED SYSTEMS, METHODS, AND DEVICES

CROSS-REFERENCE TO RELATED APPLICATION

This application is a continuation of U.S. patent application Ser. No. 17/080,537, filed Oct. 26, 2020, now U.S. Pat. No. 10,989,783, issued Apr. 27, 2021, the disclosure of which is hereby incorporated herein in its entirety by this reference.

TECHNICAL FIELD

Disclosed embodiments relate, generally, to beacon systems where a locator beacon is used as a marker for a location of interest. More specifically, some embodiments relate, generally, to improving false positive immunity in beacon systems. More specifically still, some embodiments relate, generally, to use of confiner beacons to confine a triggering area for triggering a location indication for a location of interest.

BACKGROUND

Locator beacons are radio transmitters that mark a specific location at a given instant in time. A locator beacon broadcasts a locator signal, typically a continuous or periodic wireless signals (e.g., signals carried by acoustic or electromagnetic radiation, such as radio and microwave signals, optical signals, acoustic and sonic signals, and electromagnetic induction signals, without limitation) at a specific frequency or frequency band. Signal strength of the locator signal falls off nominally as the square of a distance from a transmitting antenna to a receiving antenna. So, information about the signal strength of a locator signal at a receiving antenna and the signal strength of the locator signal at the transmitting antenna may be used to discern information about a distance a locator signal travelled and thus, to determine information about a distance between a transmitting antenna and a receiving antenna, and more specifically, a radius whether or not directional information is not included or discerned.

Information is often included in a locator signal by applying a suitable encoding technique (e.g., amplitude or angle modulation in the case of analog modulation or a keying modulation in the case of digital modulation, without limitation). Non-limiting examples of such information include one or more of: beacon identification, signal strength indication, angle-of-departure indications, messages, public/private key encryption information, and error-correction symbols.

Locator beacons are used in a variety of operational contexts, such as navigation systems to guide a user to a specific location or to inform a user of the user's specific location, locating systems and tracking systems for identifying a specific location at a given instant in time or over a period of time, and arrival notification systems for informing (e.g., triggering an audio or visual indicator, without limitation) a user of arrival at a specific location or region, without limitation.

The environment and frequencies of locator signals can affect the quality of the information discerned from such signals. Radio signals used for Bluetooth Low Energy and Wi-Fi are at 2.4 gigahertz (GHz) and 5 GHz (Wi-Fi only), and these frequencies are useful at a ranges up to a few dozen meters before they degrade if not obstructed (e.g., by objects, structures, or people, without limitation), and shorter ranges if obstructed.

Sometimes the areas overlap in which locator signals of two or more unassociated locator beacons are detectable. When a unique solution (e.g., triggering an arrival notification at a specific location but not at other locations, without limitation) is desired for a given location of a receiver, one approach known to the inventor of this disclosure is to effectively shrink the area around a locator beacon in which a notification may be triggered until non-overlapping with another locator beacon's triggering area (e.g., requiring a high signal strength). However, if a triggering area is smaller than a desirable target geographic area, then there may be false negative events, i.e., events where a receiver is within a desirable target geographic area but not within the triggering area.

Another approach known to the inventor of this disclosure is to use two or more powerful locator beacons, compute two estimates of distance from a measurement point to those beacons, and then sum the two estimates to get a figure of merit for the distance from the location to the measurement point. The inventor of this disclosure appreciates that even in controlled settings the solutions are not always unique, and there are false positives at rates that may be undesirable for some applications and unacceptable for others (e.g., auto triggering an arrival notification at the wrong ICU bed, without limitation).

Further, some frequencies used by locator signals are associated with constructive interference that obfuscates some of the distance information discerned from a locator signal. In other words, distance information of a locator signal may correspond to a closer distance than an actual distance between a receiver and a transmitter. So, in some cases there may still be false positives even if a distance threshold is set for a short distance. Moreover, multipath can set up standing waves that generate multiple false positives and false negatives as one approaches a beacon.

The inventor of this disclosure appreciates a need for localization systems that use locator beacons but without some or all of the disadvantages of conventional locator beacons discussed above.

BRIEF SUMMARY

One or more embodiments relate, generally, to a device. The device may include a communication equipment and a localization unit. The communication equipment may be configured to receive radio signals. The localization unit may be configured to: associate one or more locator signals and confiner signals with a location of interest; define a threshold of the location of interest responsive to the one or more confiner signals; suppress a location indication responsive to observing an indication of a presence of the device outside the threshold of the location of interest; and initiate the location indication responsive to observing an indication of the presence of the device within the threshold of the location of interest.

One or more embodiments relate, generally, to a computing apparatus. The computing apparatus may include a processor and a memory. The a memory may have machine executable instructions that, when executed by the processor, cause the processor to: associate one or more locator signals and confiner signals with a location of interest; define a threshold of the location of interest responsive to one or more confiner signals; suppress a location indication responsive to observing an indication of a presence of the device outside the threshold of the location of interest; and cause the location indication responsive to observing an indication of the presence of the device within the threshold of the location of interest.

One or more embodiments relate, generally, to a radio beacon system. The beacon system may include a first radio transmitter, and a second radio transmitter. The first radio transmitter arranged at a first location within a defined space. The second radio transmitters arranged at second locations, at least some locations of the second locations selected to be along a boundary of the defined space having the first location. In one embodiment, the second radio transmitters are configured to generate anti-locator radio signals indicative of the one or more second radio transmitters being at locations other than within the defined space.

One or more embodiments relate, generally, to a localization method. The method may include associating one or more locator signals and confiner signals with a location of interest; defining a threshold of the location of interest responsive to one or more confiner signals; suppressing a location indication responsive to observing presence of a location unit outside the threshold of the location of interest; and triggering the location indication responsive to observing a presence of the location unit within the threshold of the location of interest.

One or more embodiments relate, generally, to an apparatus. The apparatus may include a first signal detector, a second signal detector, and a location trigger. The first signal detector may be configured to sense a first signal, wherein the first signal that the first signal detector senses exhibits measurable changes as the wireless receiver draws closer to, or draws away from, a first signal source. The second signal detector may be configured to sense a second signal, wherein the second signal that the second signal detector senses exhibits a measurable change as the wireless receiver enters or leaves a vicinity of the first signal source. The location trigger may be configured to generate a location indication, wherein a triggering condition of the location trigger is that the second signal corresponds to a presence of the wireless receiver within the vicinity of the first signal source.

One or more embodiments relate, generally, to an apparatus. The apparatus may include communication equipment and a localization unit. The communication equipment configured to receive radio signals. The localization unit may be configured to observe a locator signal having a distance indication that meets a triggering threshold for a location of interest; calculate an apparent location of the a source of the locator signal in response to the distance indication; define a confined triggering area of the locator beacon responsive to a number of confiner signals associated with the location of interest; observe that the apparent location of the source of the locator signal is outside the confined triggering area; and ignore the locator signal.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1A:
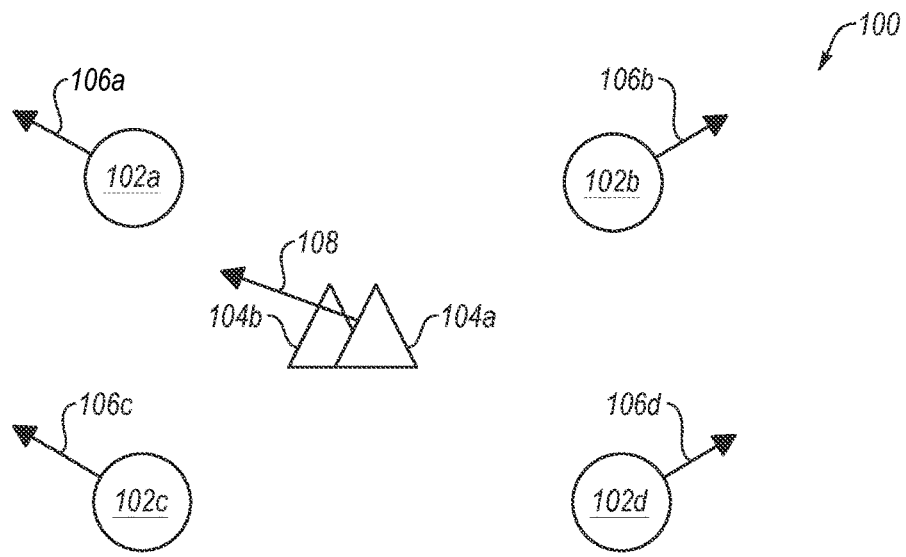
FIG. 1A, FIG. 1B, and FIG. 1C are diagrams depicting confinement of a triggering area of a locator beacon in accordance with one or more embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, the term "distance" carries its plain and ordinary meaning to a person having ordinary skill in the art. Distance may be measured in one or more of Cartesian, polar, and spherical coordinate systems without exceeding the scope of this disclosure. If a signal is described herein as "radially broadcast" or "radially transmitted," then the discussion should be understood to apply to transmission in 2D and 3D space, unless expressly stated otherwise. Received signal strength indications (RSSI) are a non-limiting example of distance information, where a value of an RSSI generally increases as a receiver draws near a transmitter and a value of an RSSI generally decreases as a receiver draws away from a transmitter. Such values of RSSI are a non-limiting example of a distance indication. Other types of distance indications do not exceed the scope of this disclosure, such as timing, phase shift, and cross-correlation information that may be used with multilateration position location estimation, or hyperbolic position location estimation sometimes associated with radar type position, navigation and timing systems.

While some specific non-limiting examples discussed herein assume operation without or with disregard for directional information, use of directional information or directional information with radial information, additionally or alternatively, is contemplated and does not exceed the scope of this disclosure. As a non-limiting example, a shaped beacon antenna pattern may be used—such as a beacon that includes a parabolic reflector, without limitation—that provides directional information.

A moving receiver and a stationary transmitter may be used as a convenient, and non-limiting, convention for discussion herein. A person having ordinary skill in the art would understand that disclosed embodiments are applicable to instances of a stationary receiver and a moving transmitter and instances of a moving transmitter and a moving receiver, all without exceeding the scope of this disclosure.

As used herein, "frequency" means frequency or frequency band.

One or more embodiments relate, generally, to confining a triggering area of a first locator beacon that is a marker for a location of interest (or multiple locator beacons that are a marker for a location of interest). Signals of one or more second locator beacons referred to herein as "confiner" beacons are used to confine a portion of an available triggering area to a target triggering area (i.e., a "confined triggering area") for triggering a location indication that corresponds to a location of interest. In some embodiments, a confinement algorithm is used to generate a threshold of a location of interest and a location indication is generated only if a distance indication meets or exceeds the threshold.

Figure 1B:
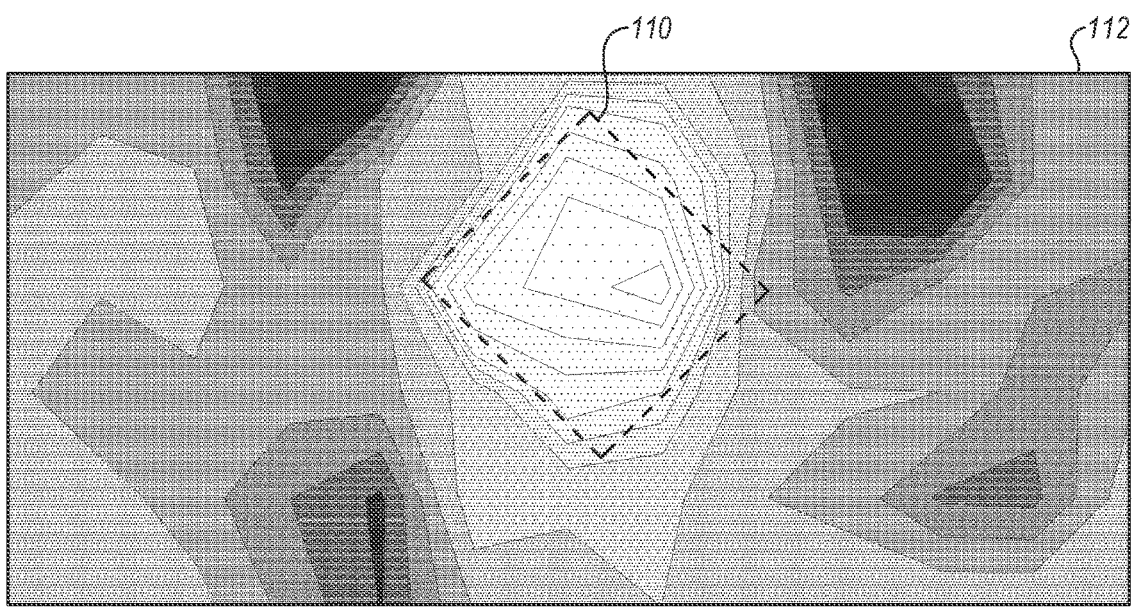
Figure 1C:
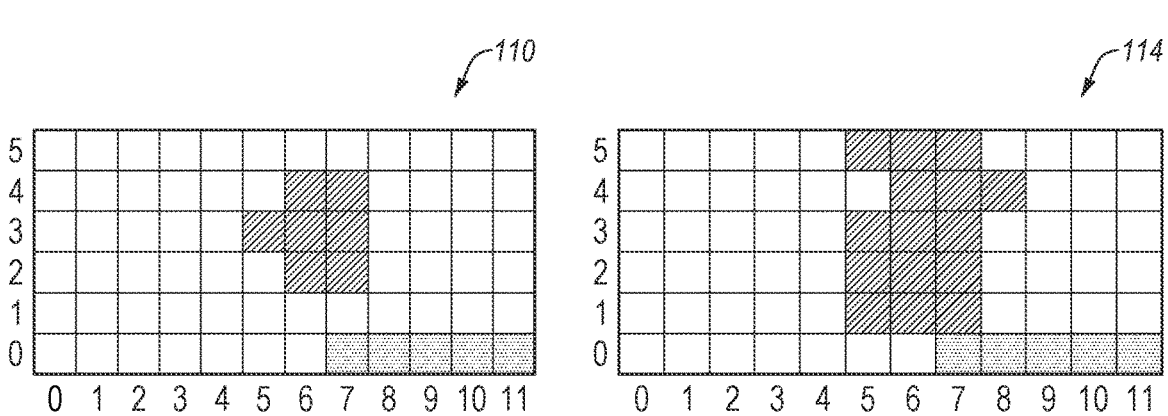

FIG. 1A, FIG. 1B and FIG. 1C illustrate confinement of a triggering area of locator beacons 104a, 104b in accordance with one or more embodiments.

FIG. 1A is a diagram depicting a localization system 100 that includes confiner beacons (confiner beacon 102a, confiner beacon 102b, confiner beacon 102c, and confiner beacon 102d) arranged to confine a triggering area of a locator beacon (locator beacon 104a, 104b) that is a marker for a location of interest.

Distance information may be derived from broadcast locator signal 108 generated by locator beacons 104a, 104b. A distance threshold associated with locator beacons 104a, 104b may define an available triggering area for triggering a location indication for the location of interest marked by locator beacons 104a, 104b. For example, if a distance threshold is set to a signal strength that corresponds to 10 meters, then detecting a locator signal having lower signal strength does not trigger a location indication.

Distance information may be derived from broadcast confiner signals (e.g., confiner signal 106a, confiner signal 106b, confiner signal 106c and confiner signal 106d). A threshold (or boundary) for a confined triggering area (for triggering a location indication for the location of interest marked by locator beacons 104a and 104b) may be calculated in response to the distance information of confiner signals. A localization unit may be configured to generate a location indication if a distance indication for locator signals meets a calculated threshold for the confined triggering area and a distance threshold, or just the threshold for the confined triggering area. If a distance indication for locator signal 108 fails to meet a calculated threshold for the confined triggering area (e.g., a signal is too weak), then triggering a location indication for the location of interest may be suppressed as discussed herein.

Notably, size and shape of disclosed triggering areas is not necessarily static. As a non-limiting example, a person having ordinary skill in the art would understand that measured signal strength at a receiver may vary for any of a number of reasons other than change in distance—intentional and unintentional. A boundary of an available or confined triggering area may be a line or more like a region, and such a boundary may or may not be capable of precise demarcation, all without exceeding the scope of this disclosure.

FIG. 1B is a contour plot depicting distance indications, here, the difference between (a) the sum of the signal amplitudes of the confiner signals and (b) the sum of the signal amplitudes of locator signals of confiner signal 106a, confiner signal 106b, confiner signal 106c and confiner signal 106d and locator signal 108 of FIG. 1A within an area 112. When the algorithm discussed above is applied, a triggering area of locator beacons 104a, 104b corresponds to confined triggering area 110.

FIG. 1C is a diagram depicting, side-by-side, a grid of confined triggering area 110 and a grid of an available triggering area 114 (no confiner beacons). As depicted by FIG. 1C, distance indications exceed a distance threshold in a smaller area when confiner beacons/signals are present (i.e., confined triggering area 110) versus when confiner beacons/signals are not present (i.e., available triggering area 114).

Figure 2:
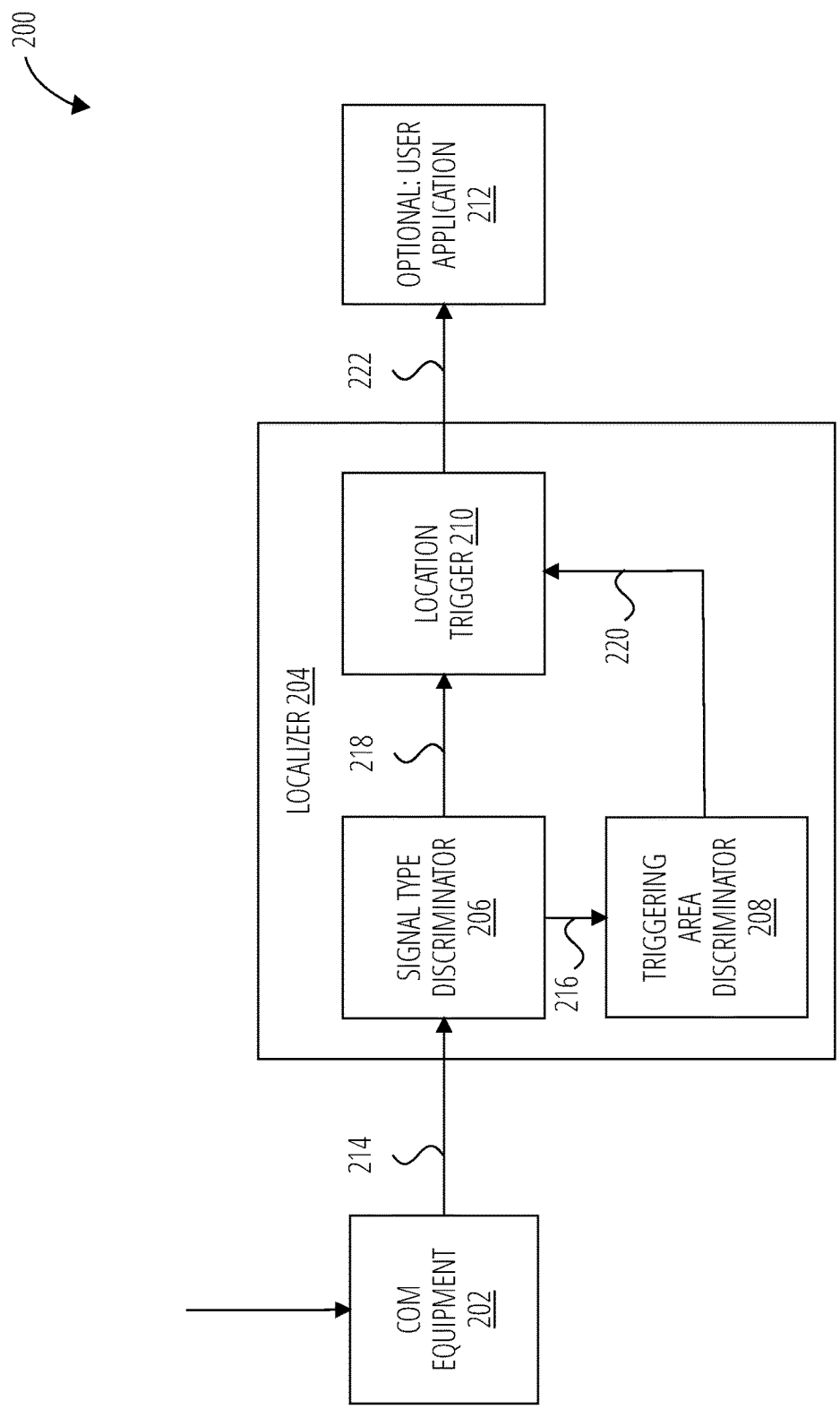
FIG. 2 is a diagram depicting a receiver apparatus that includes a localizer 204 for generating location indications within a confined triggering area, in accordance with one or more embodiments.

FIG. 2 is a functional block diagram depicting a receiver apparatus 200 that includes a localizer 204 for generating location indications within a confined triggering area, in accordance with one or more embodiments. Receiver apparatus 200 may include COM Equipment 202, localizer 204 and an optional user application 212.

COM Equipment 202 may be configured, generally, to receive radio signals 214 that include locator signals and/or confiner signals disclosed herein. As non-limiting examples, COM Equipment 202 may include a radio communication modem configured to receive radio signals (e.g., via one or more antennas) such as Wi-Fi signals, Bluetooth signals, ultra-wide bandwidth (UWB) signals, audio signals, and Near Field Communication (NFC) signals, without limitation. While specific non-limiting examples refer to radio signals, embodiments include any wireless signal (e.g., signals carried by acoustic or electromagnetic radiation—such as radio and microwave signals, optical signals, acoustic and sonic signals, and electromagnetic induction signals, without limitation).

Localizer 204 may be configured, generally, to receive radio signals 214 that include locator and/or confiner signals and, in response, generate location indications 222. Generally speaking, localizer 204 may include a first signal detector and a second signal detector. The first signal detector may be configured to sense a first signal that exhibits measurable changes as a wireless receiver draws closer to, or draws away from, a first signal source. The second signal detector may configured to sense a second signal that exhibits a measurable change as the wireless receiver enters or leaves a vicinity of the first signal source.

In the specific example depicted by FIG. 2, localizer 204 include signal type discriminator 206, triggering area discriminator 208 and location trigger 210.

Signal type discriminator 206 may be configured, generally, to generate first radio signal 218 and first and second radio signals 216 in response to radio signals 214. More specifically, signal type discriminator 206 is configured to discriminate among first types of radio signals (e.g., locator signals) and second types of radio signals (e.g., confiner signals) that are included in radio signals 214, and separately provide the different types of radio signals.

Triggering area discriminator 208 may be configured, generally, to receive first and second radio signals 216 (e.g., locator signals and confiner signals) and, in response, generate presence indications 220 that indicates whether or not a wireless receiver is within or outside a confined triggering area.

Location trigger 210 may be configured, generally, to receive first radio signal 218 (e.g., locator signals) and presence indications 220, and, in response, generate location indications 222 that indicate whether or not a location of interest is within a pre-specified distance. If a distance indication of a first radio signal 218 (e.g., a locator signal) is below a triggering threshold or a presence indication 220 indicates a presence of wireless receiver outside a confined triggering area then location indication 222 may be indicative of no location or no indication may be generated. If a distance indication of a first radio signal 218 (e.g., a locator signal) is at or above a triggering threshold and a presence indication 220 indicates presence of a wireless receiver within a confined triggering area than location indication 222 may be indicative of a location of interest.

Also shown is an optional user application 212 that is configured to take an action responsive to location indication 222. As non-limiting examples, user application 212 may be a guide for notifying a user of nearby locations of interest. As another non-limiting example, user application 212 may be a game that triggers events when a wireless receiver is near a location of interest. As another non-limiting example, user application 212 may be a tracking application that logs when a wireless receiver is near a location of interest.

Figure 3:
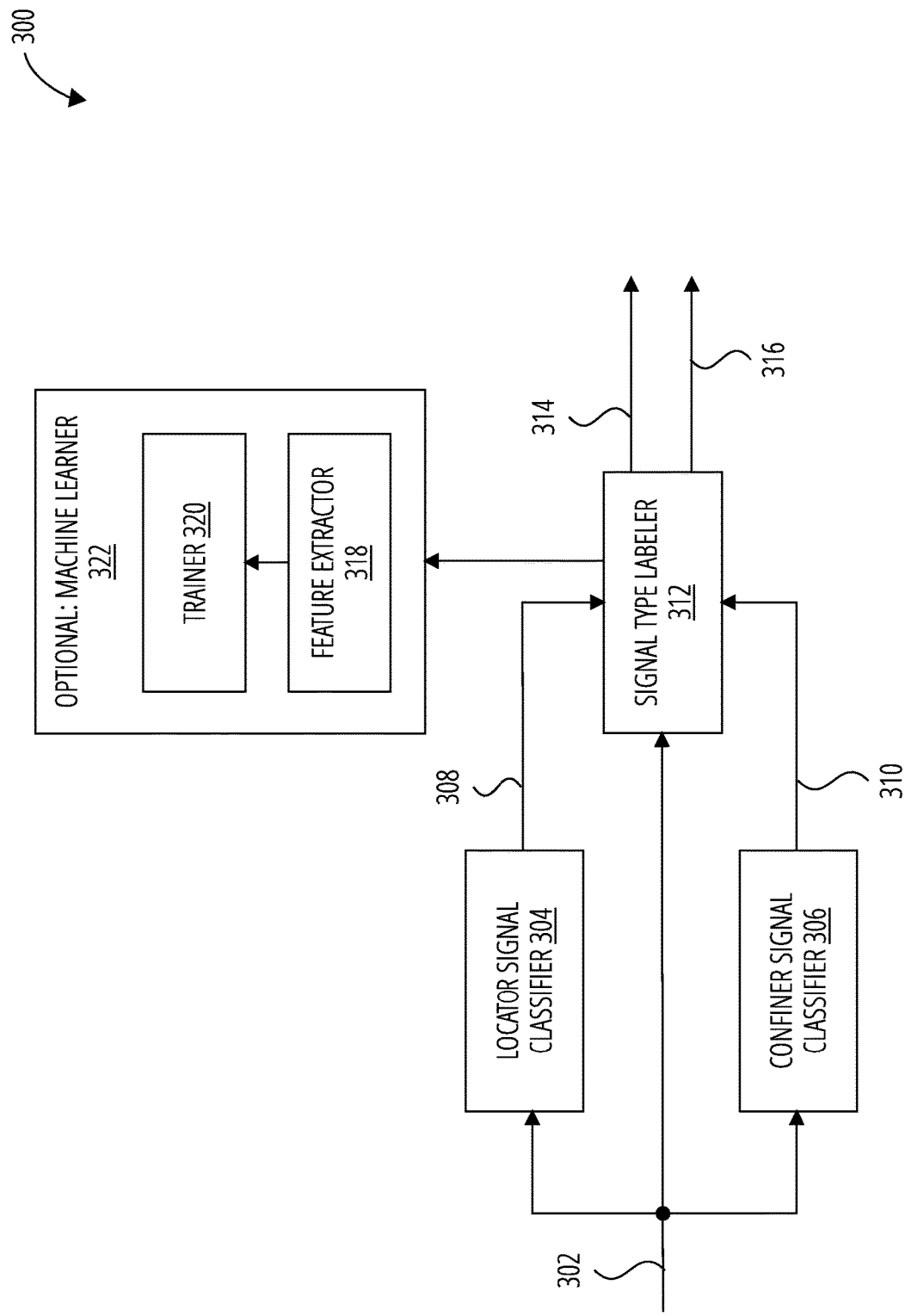
FIG. 3 is a diagram depicting an embodiment of a signal type discriminator.

FIG. 3 is a functional block diagram depicting a signal type discriminator 300, a non-limiting example of a signal type discriminator 206, in accordance with one or more embodiments. Locator signal classifier 304, confiner signal classifier 306, and signal type labeler 312 define a classification block of signal type discriminator 300 configured to classify radio signals 302 as locator signal classifications 308 or confiner signal classifications 310 and generate labeled radio signals bearing confiner labels 316 or locator labels 314. In one embodiment, classifications may be performed in response to identifiers encoded in respective locator and confiner signals. As a non-limiting example, a beacon type identifier (e.g., "confiner beacon," "locator beacon" and an identifier for a location of interest, without limitation) may be encoded in a radio signal. As another non-limiting example, a transmitter identifier (e.g., a serial number or unit name, without limitation) may be encoded in a radio signal, and each of locator signal classifier 304 and confiner signal classifier 306 may correlate the transmitter identifier to a list of known locator beacons and confiner beacons. In some embodiments, a locator beacon and/or locator signals associated with a different location than the location of interest may be associated with confiner beacon of the location of interest. By way of non-limiting example, a portable receiver may be configured to receive a user input of a desired location (i.e., a location of interest). A localization unit of the receiver may be configured to associate locator signals of other locations (i.e., not the location of interest) with confiner signals of the location of interest. In this manner, if a geographic area or space (i.e., three-dimensional space) is logically divided into a number of areas or spaces (each a respective "location"), then locator signals of the respective locations may act as confiner signals serving to at least partially define the boundaries of adjacent locations.

Additionally or alternatively to an absolute classification block, locator signal classifier 304 and confiner signal classifier 306 may define a predictive classification block whereby respective trained classification algorithms of locator signal classifier 304 and confiner signal classifier 306 predict classifications of radio signals 302. In such an embodiment, locator signal classifier 304 and confiner signal classifier 306 may be trained by an (optional) machine learner 322 that observes the classification labels applied by signal type labeler 312 to radio signals 214, confidence values, and unclassified radio signals 214 (i.e., radio signals where the confidence values fell below a threshold for applying a label). Feature extractor 318 of (optional) machine learner 322 attempts to identify additional features or evaluation weight applied to features in feature vectors associated with the classifications, and trainer 320 further trains locator signal classifier 304 and confiner signal classifier 306 in response to updated feature vectors using any suitable training algorithm known to a person having ordinary skill in the art. In various embodiments, some or a totality of (optional) machine learner 322 may be implemented at a portable receiver, a server, workstation, or a cloud computing environment. At a workstation, server or cloud computing environment, machine learner 322 may co-operate with multiple localization units (and/or signal discriminators) executing at a same computing system (e.g., workstation, server or cloud computing environment, without limitation), communicate with multiple localization units (and/or signal discriminators) executing at separate computing systems via a network communicatively coupled to both the computing system of the machine learner and the computing systems of the multiple localization units (and/or signal discriminators), where it learns from classification labels applied to wireless signals applied by signal type discriminators in the same or different localization units.

Figure 4:
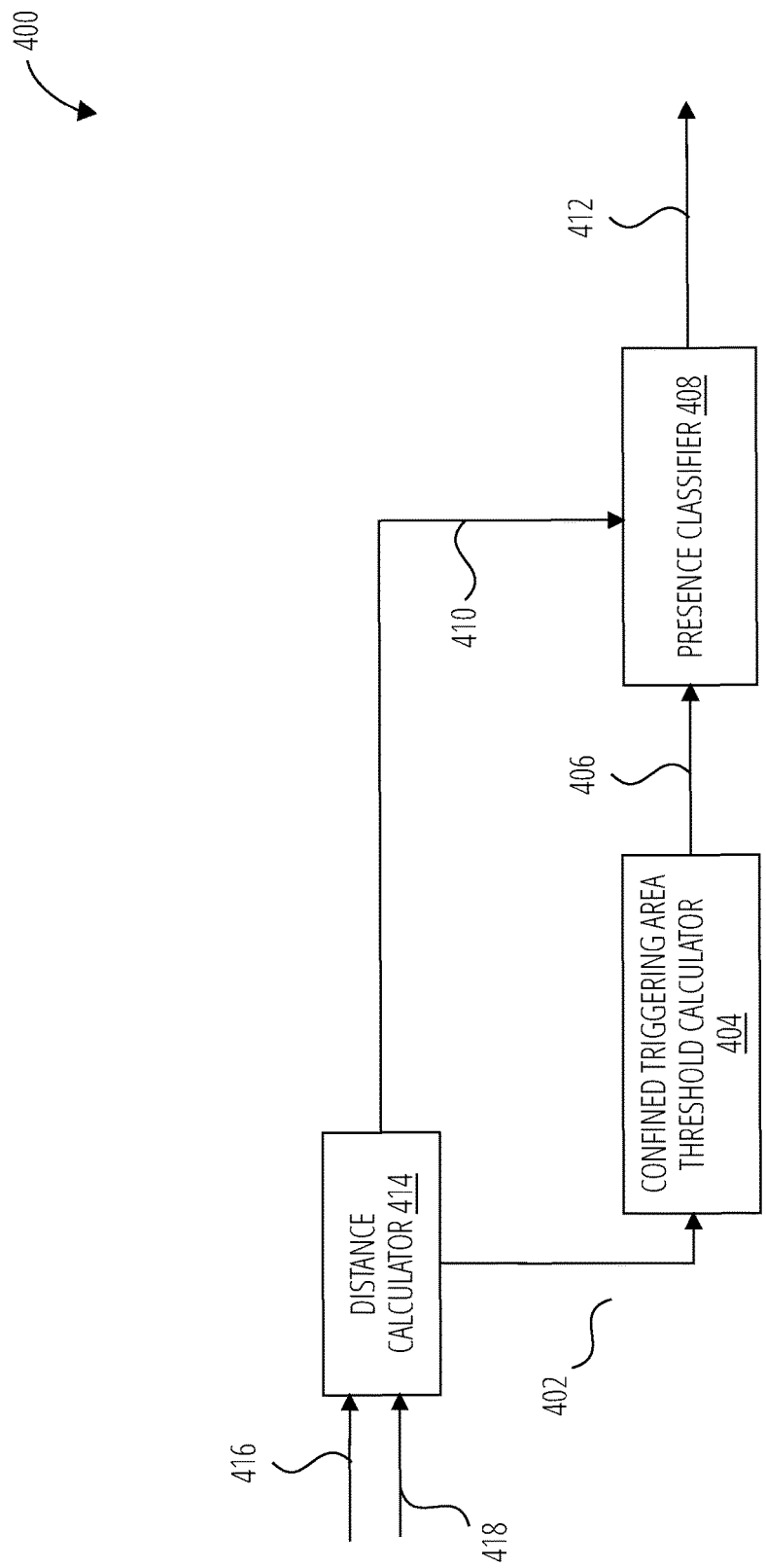
FIG. 4 is a diagram depicting an embodiment of a triggering area discriminator.

FIG. 4 is a functional block diagram depicting a triggering area discriminator 400, which is a non-limiting example of a triggering area discriminator 208. Triggering area discriminator 400 includes distance calculator 414, confined triggering area threshold calculator 404 and presence classifier 408.

Distance calculator 414 is configured to generate distance indications 402 for confiner signals 418 and distance indications 410 for locator signals 416. Distance calculator 414 may be, as non-limiting examples, a signal strength (e.g., power in decibels, without limitation) detector. One or more of time of flight and signal strength relationships may be defined and stored by distance calculator 414 and used to generate confining distance indications 402 and locating distance indications 410.

Confined triggering area threshold calculator 404 may be configured, generally, to generate a threshold indication 406 for a location of interest responsive to distance indications 402. In one embodiment, distance indications for confiner signals may be summed to generate a threshold indication 406. In another embodiment, both confiner and locator signals may be viewed as vector inputs (linear or nonlinear) to triggering area discriminator 400. Vector inputs corresponding to each confiner signal and locator signal are compared to a distance threshold. In yet other embodiments, any of techniques for determining a threshold indication 406 may be improved by throwing out weaker signals or weighting such signals less (i.e., less of a contribution to the threshold indication) than stronger confiner signals.

Presence classifier 408 may be configured, generally, to generate presence indications 412 in response to threshold indications 406 and distance indications 410 of locator signals. More specifically, presence classifier 408 may be configured to generate presence indication 412 indicative of a presence within a confined triggering area (e.g., confined triggering area 110, without limitation) and configured to generate a presence indication 412 indicative of not being present within a confined triggering area (i.e., being outside the confined triggering area). In this manner, presence indication 412 changes in a measurable way when a wireless receiver enters and leaves a confined triggering area. Additionally or alternatively to learning features of signal types and training machine learning models based thereon, a machine learner 322 (or another machine learner) may receive presence indications 412 and information about such wireless signals, without limitation and generate machine learning models trained to recognize a presence of receiver at a location of interest.

Figure 5:
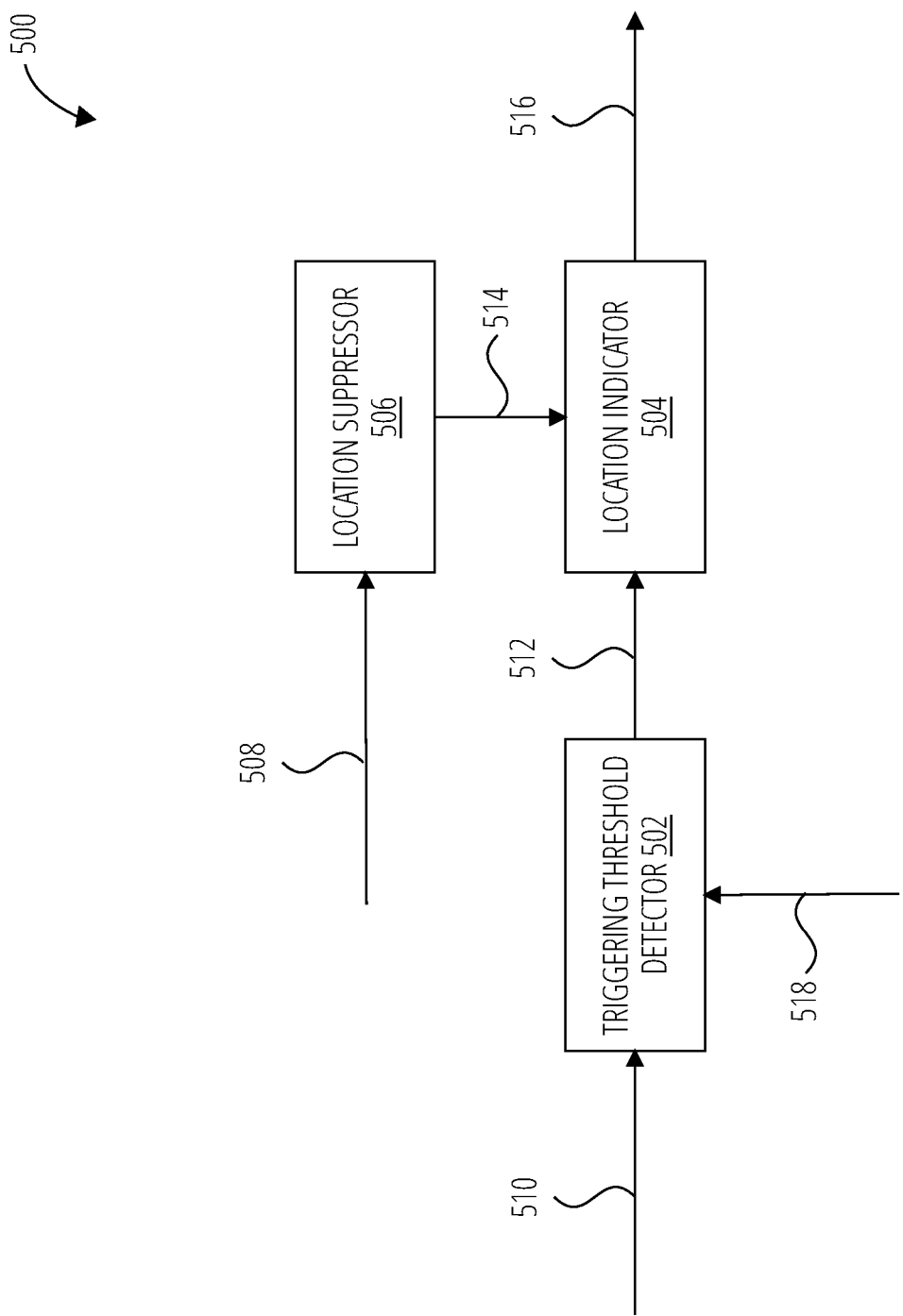
FIG. 5 is a diagram depicting an embodiment of a location trigger.

FIG. 5 is a functional block diagram depicting a location trigger 500, an example embodiment of a location trigger 210. Location trigger 500 includes triggering threshold detector 502, location suppressor 506, and location indicator 504. Triggering threshold detector 502 may be configured, generally, to generate triggering indication 512 in response to distance indication 510 and a distance threshold 518. Location indicator 504 may be configured, generally, to generate location indication 516 in response to triggering indication 512 and suppression indication 514. If suppression indication 514 is indicative of suppressing a location indication or triggering indication 512 is indicative of a distance indication 510 that does not meet the distance threshold 518 then location indicator 504 may generate a location indication 516 indicative of no location detected or not generate a location indication 516 at all. If suppression indication 514 is indicative of not suppressing a location indication and triggering indication 512 is indicative of a distance indication 510 that meets or exceeds the distance threshold 518 then location indicator 504 may generate a location indication 516 indicative of a location detected. In some cases, multiple detectors/receivers may be present and may or may not cooperate. In such cases, supressing a triggering indication for a first receiver does not imply suppressing the indication of a second or other receiver(s). Calculations are performed independenity.

Location suppressor 506 may be configured to generate suppression indication 514 in response to a presence indication 508. In some embodiments, location suppressor 506 may be or include a signal detector configured to detect whether presence indication 508 is indicative of a presence within a confined triggering area. If presence indication 508 is indicative of a presence within a confined triggering area than location suppressor 506 may generate a suppression indication 514 indicative of no suppression or not generate any suppression indication 514 at all. If presence indication 508 is indicative of presence outside a confined triggering area than location suppressor 506 may generate suppression indication 514 indicative of suppression.

Figure 6:
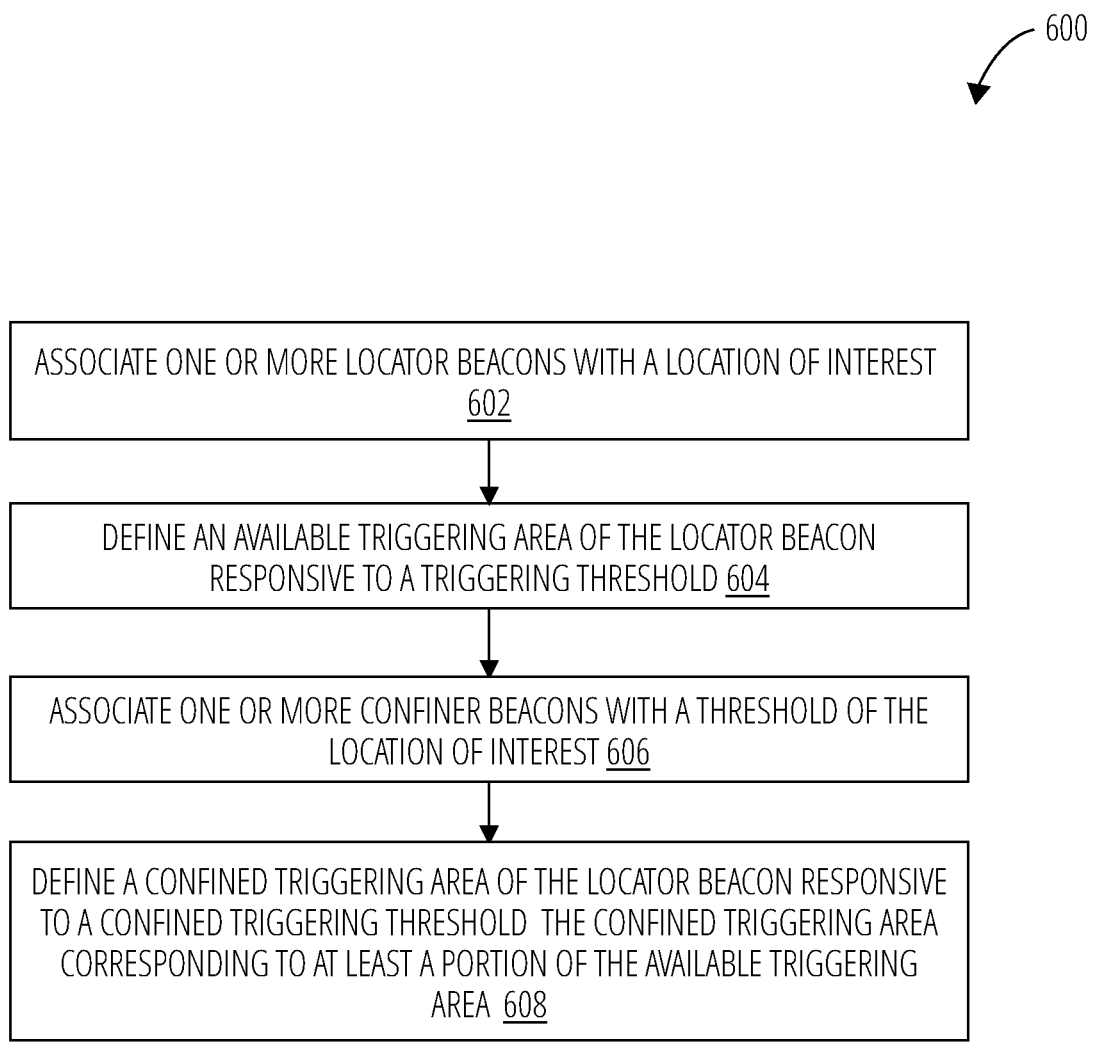
FIG. 6 is a flowchart depicting a process for set up of a localization system, in accordance with one or more embodiments.

FIG. 6 is a flowchart depicting a process 600 for set up of a localization system, in accordance with one or more embodiments.

At operation 602, process 600 associates one or more locator beacons with a location of interest. Non-limiting examples of a location of interest include a geographic area, an area of a structure (e.g., a room, floor, or the defined area of a building, without limitation), an attraction (e.g., a retail location, or a theme park attraction, a display at a museum or art studio, without limitation), or a checkpoint (e.g., a geographic location associated with a virtual system such as a game, without limitation). Multiple locator beacons may be associated with a location of interest by physically locating a locator beacon near the location of interest and either logically associating the locator beacon with the location of interest at the locator beacon (e.g., programming an association) or at a separate electronic record that defines relationships between locator beacons and locations of interest.

At operation 604, process 600 defines an available triggering area of the one or more locator beacons. The locator and confiner signals exhibit measurable changes as the wireless receiver draws closer to, or draws away from, the signal sources (e.g., the locator and/or confiner beacons). In a case where a value of a distance indication (e.g., RSSI, without limitation) of a locator signal changes in a generally increasing manner as a receiver draws closer to a locator beacon (i.e., closeness increases but actual distance decreases) and changes in a generally decreasing manner as a receiver draws away from a locator beacon (i.e., closeness decreases and actual distance increases), the available triggering area of an individual locator beacon may be set by defining a value of a triggering threshold. In a case where RSSI is used as a (nonlinear) measure of distance, an RSSI value of a signal would generally increase as a receiver draws closer to a transmitter (e.g., a locator or confiner beacon) and decrease as the receiver draws away from a transmitter, and so triggering threshold may be set to correspond to a desired distance. In other cases, various measures of distance may be combined and a triggering threshold set accordingly. In cases where multiple locator beacons are used, each locator beacon may have an available triggering area and a location of interest may have a triggering area corresponding to the combined available triggering areas of the locator beacons.

At operation 606, process 600 associates one or more confiner beacons with a threshold of the location of interest. The one or more confiner beacons may be associated with the threshold of the location of interest by physically locating confiner beacons outside of the location of interest and then logically associating (e.g., in software or a lookup table, without limitation) the confiner beacons with a threshold of one or more locations. "One or more" because a confiner beacon may define confined triggering areas for multiple locations such as discussed later herein with reference to FIG. 14B. Moreover, a first location's locator beacon may be a second location's confiner beacon. In other words, at operation 606, some of the confiner beacons associated with a threshold of a location by process 600 may be associated with a second location of interest in operation 602 of different execution of process 600.

At operation 608, process 600 defines a confined triggering area that corresponds to at least a portion of an available triggering area. In various embodiments, a confined triggering area may be defined by setting a confined triggering threshold. A confined triggering threshold may be calculated in response to a confinement algorithm and/or desired values of distance indications of confiner signals of the confiner beacons for the confined triggering area. Generally, when trying to align a triggering area threshold with a desired triggering area, a designer may account how a threshold will be defined. If a threshold is defined as when the signal strength of a locator beacon is expected to exceed the signal strength of a confiner beacon then beacons can be arranged accordingly.

Figure 7:
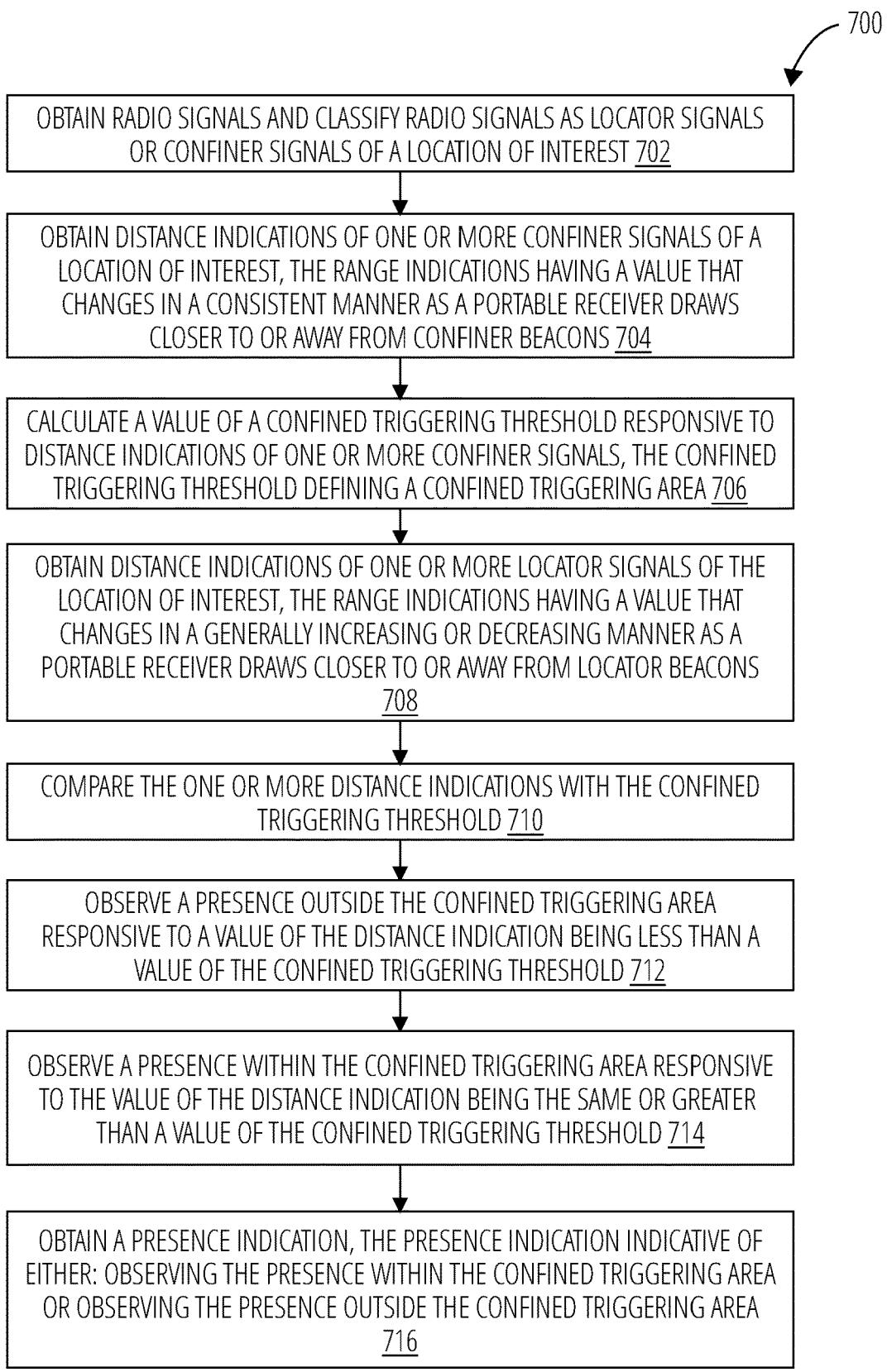
FIG. 7 is a flowchart depicting a process for detecting a presence within or outside a confined triggering area, in accordance with one or more embodiments.

FIG. 7 is a flowchart depicting a process 700 (performed, e.g., by a localization unit or portable receiver/transmitter) for detecting a presence within or outside a confined triggering area, in accordance with one or more embodiments.

At operation 702, process 700 obtains radio signals and classifies one or more of the radio signals as locator signals or confiner signals of a location of interest.

At operation 704, process 700 obtains distance indications of the one or more confiner signals associated with a location of interest. In the case of RSSI distance indication, they have respective values that change in a generally increasing manner as a portable receiver performing process 700 draws closer to confiner beacons, and a generally decreasing manner as a portable receiver performing process 700 draws away from confiner beacons associated with a threshold of the location of interest.

At operation 706, process 700 calculates a value of a confined triggering threshold responsive to the distance indications of the one or more confiner signals and a confinement algorithm. The confined triggering threshold defines a confined triggering area for the location of interest. For multiple confiner signals, individual values may be combined such that the result is an averaged or weighted averaged of the confiner signals.

At operation 708, process 700 obtains distance indications of one or more locator signals of the location of interest. These distance indications have respective values that also change in a consistent manner as a portable receiver performing process 700 draws closer to or away from locator beacons associated with a location of interest.

At operation 710, process 700 compares the one or more distance indications of the locator beacons with the confined triggering threshold. In some embodiments, comparison may involve subtracting a signal strength value of a confiner signal from a locator signal.

At operation 712, process 700 detects a presence outside the confined triggering area in response to a value of the distance indication of the locator beacon being less than a value of the confined triggering threshold, and at operation 714, process 700 detects a presence within the confined triggering area in response to a value of the distance indication of the locator beacon being greater than a value of the confined triggering threshold.

At operation 716, process 700 obtains a presence indication. The presence indication is indicative of either: a detected presence within or detected presence outside the confined triggering area.

Figure 8:
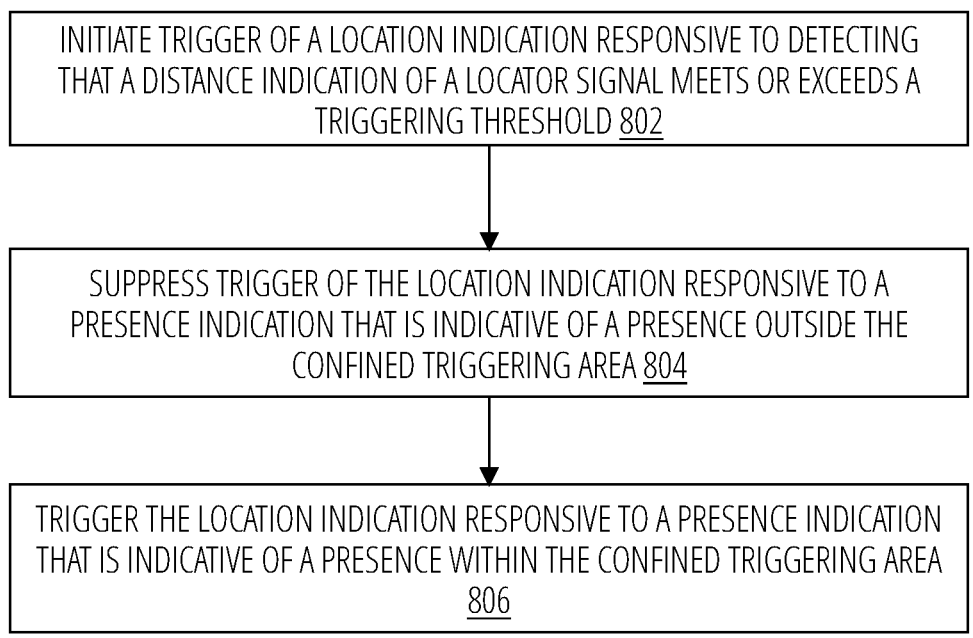
FIG. 8 is a flowchart depicting a triggering process, in accordance with one or more embodiments.

FIG. 8 is a flowchart depicting a triggering process 800, in accordance with one or more embodiments.

At operation 802, triggering process 800 initiates trigger of a location indication responsive to detecting that a distance indication of a locator signal meets or exceeds a triggering threshold.

At operation 804, triggering process 800 suppresses trigger of the location indication responsive to a presence indication that is indicative of a presence outside the confined triggering area. In some embodiments, an act of suppression may include an independent determination and then act in response to that determination. In other embodiments suppression may occur implicitly when a signal strength of a confiner signal and a locator signal are summed.

At operation 806, triggering process 800 triggers the location indication responsive to a presence indication that is indicative of a presence within the confined triggering area.

Figure 9:
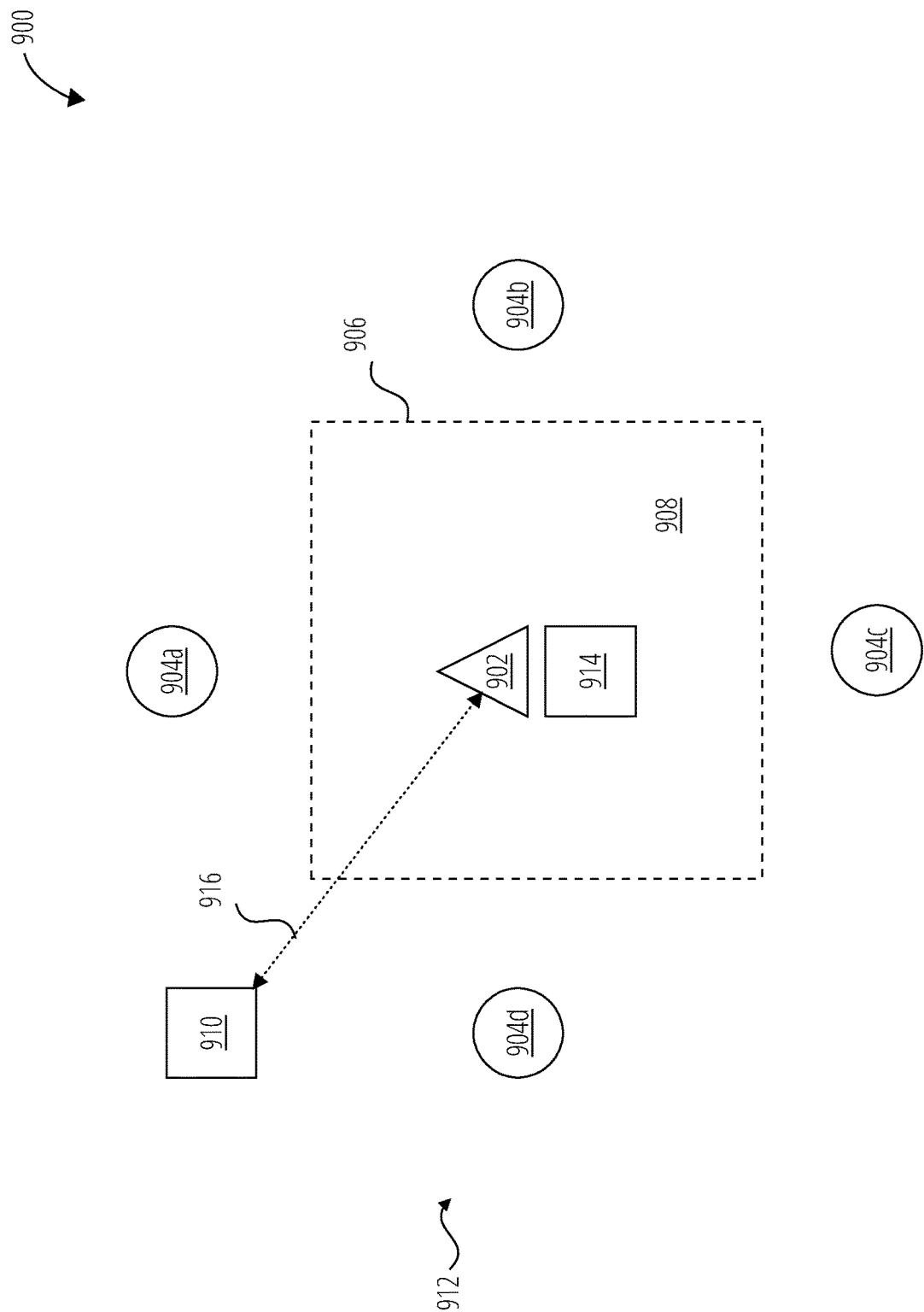
FIG. 9 is a schematic diagram of an example localization system 900 in accordance with one or more embodiments.

FIG. 9 is a schematic diagram of an example localization system 900 in accordance with one or more embodiments. Locator beacon 902 is associated with, and physically located with, location of interest 914. Confiner beacons 912, here, confiner beacon 904a, confiner beacon 904b, confiner beacon 904c, and confiner beacon 904d, are arranged around locator beacon 902 such that the confiner signals emitted by the confiner beacons "confine" a triggering area of the locator beacon 902 to confined triggering area 908 defined by confined triggering area threshold 906. In a contemplated operation, portable wireless device 910 is configured to trigger a location indication upon a distance 916 between portable wireless device 910 and locator beacon 902 decreasing to within confined triggering area threshold 906.

In some embodiments, disclosed confiner beacons may be arranged in beacon systems to create a dead space that might otherwise result in non-unique location indicators.

Figure 10A:
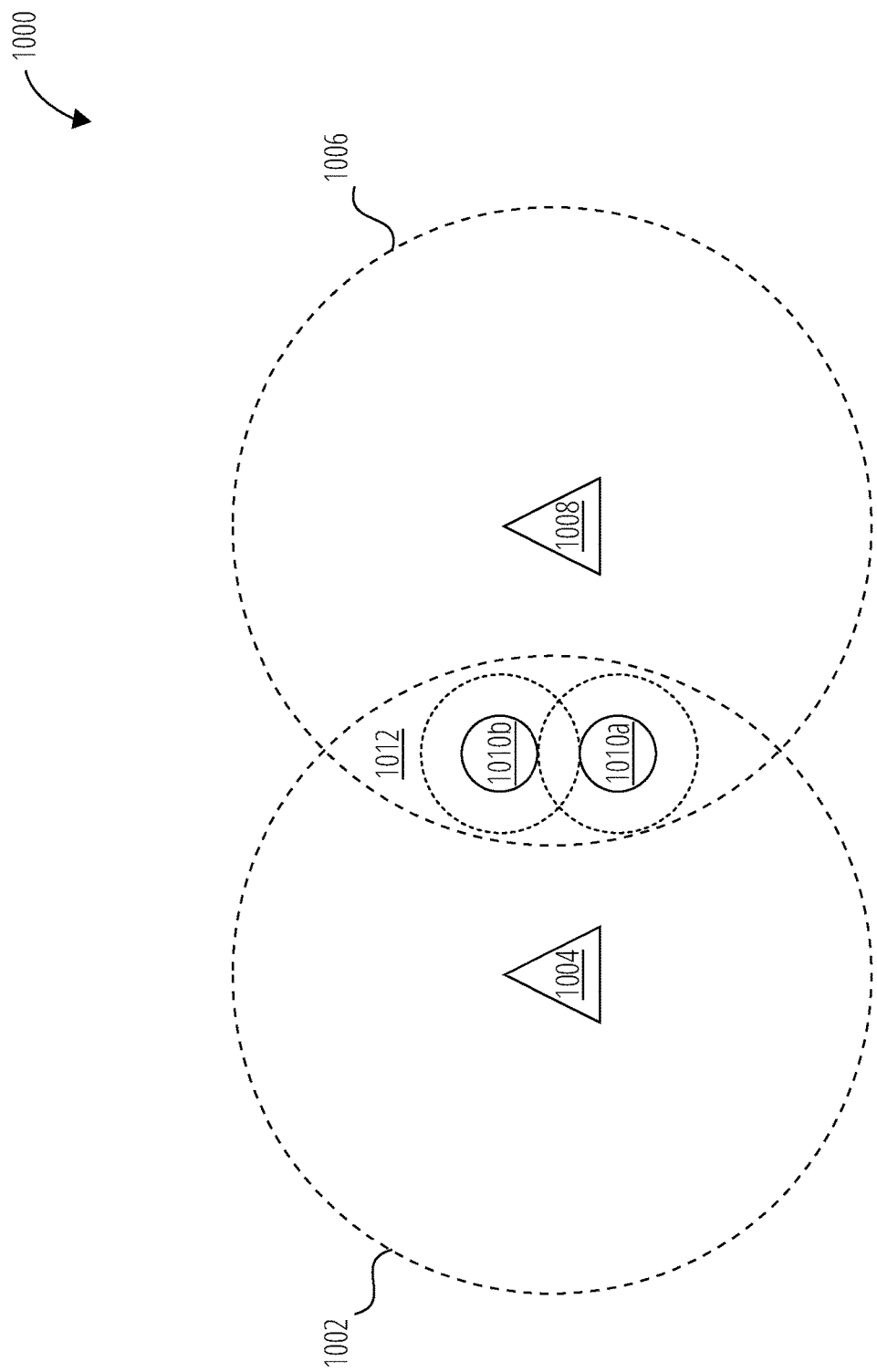
FIG. 10A and FIG. 10B are schematic diagrams that depict an example of a beacon system including confiner beacons arranged to create a dead space between two locator beacons, in accordance with one or more embodiments.
Figure 10B:
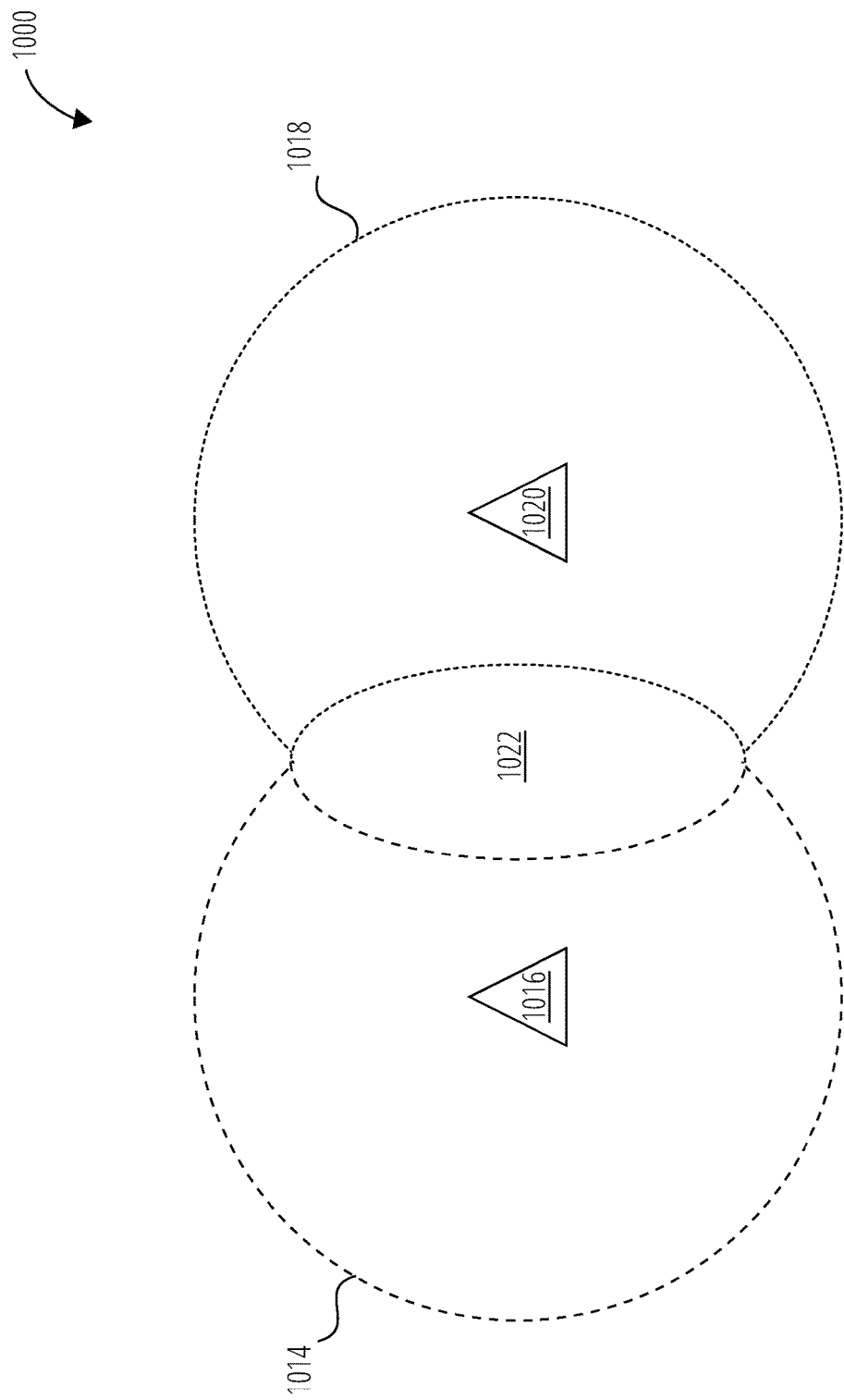

FIG. 10A and FIG. 10B are schematic diagrams that depict a non-limiting example of a beacon system 1000 including confiner beacon 1010a and confiner beacon 1010b respectively arranged to create a dead space between locator beacon 1004 and locator beacon 1008.

As depicted by FIG. 10A, a triggering area defined by first available triggering area threshold 1002 associated with locator beacon 1004 and a triggering area defined by second available triggering area threshold 1006 associated with locator beacon 1008 overlap at overlapping area 1012. Confiner beacon 1010a and confiner beacon 1010b are arranged at locations within overlapping area 1012 such that their respective confiner signals define a dead area at overlapping area 1012. Moreover, a portion of first available triggering area defined by threshold 1002 defines a portion of the dead area that confines locator beacon 1008, and a portion of second available triggering area defined by threshold 1006 defines a portion of the dead area that confines locator beacon 1004.

As depicted by FIG. 10B, in cooperation with confiner beacons 1010a and confiner beacon 1010b, a first confined triggering area threshold 1014 is defined for a confined triggering area of locator beacon 1016, and second confined triggering area threshold 1018 is defined for a confined triggering area of locator beacon 1020. Moreover, a dead region 1022 is defined that is not part of either locator beacons' confined triggering area.

In some embodiments, disclosed confiner beacons may be arranged to confine triggering areas in three-dimensions, for example, a room on a specific floor of a building.

Figure 11:
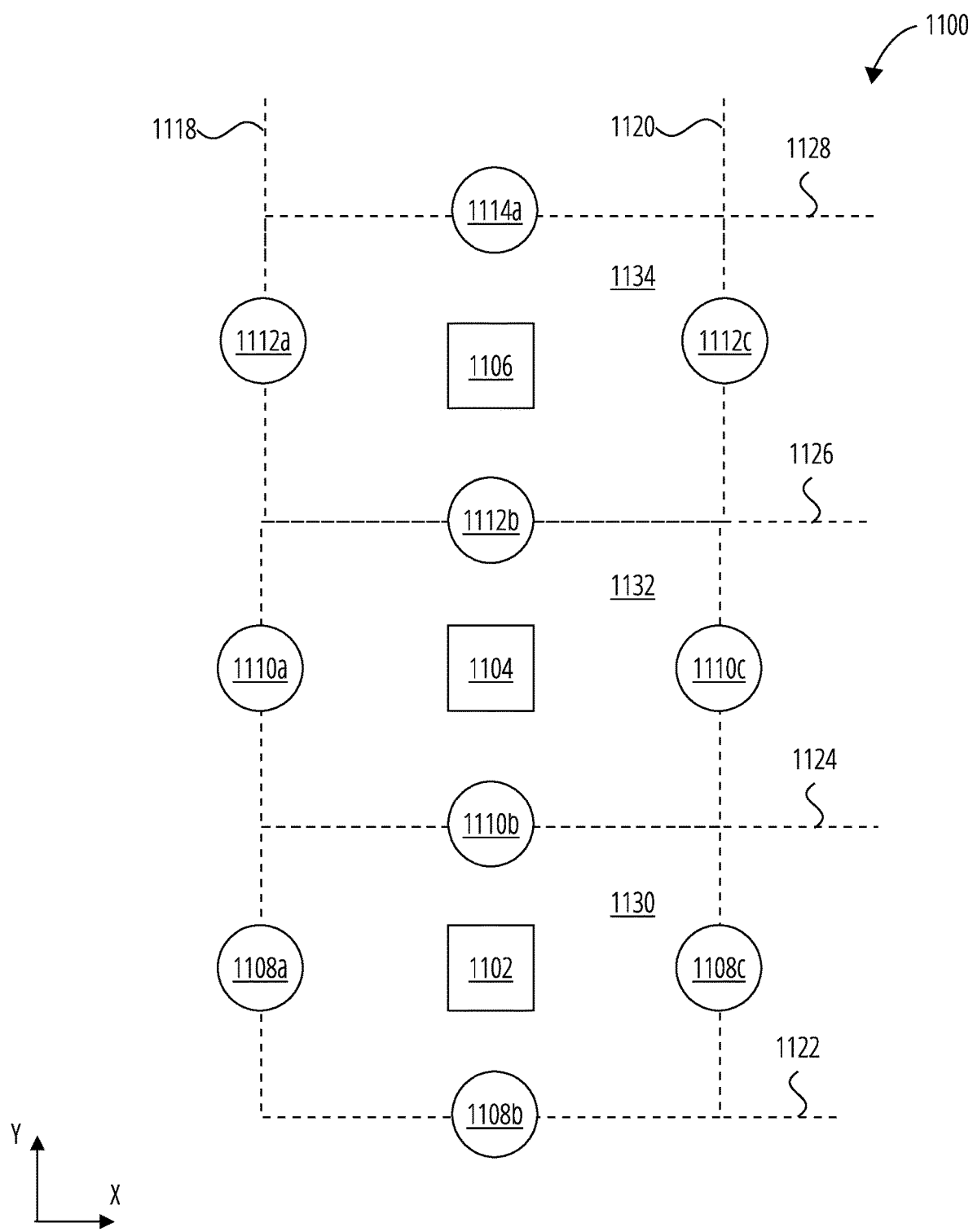
FIG. 11 is a schematic diagram depicting an example beacon system that includes locator beacons and confiner beacons arranged to confine triggering areas in at least two-dimensions—horizontally and vertically, in accordance with one or more embodiments.

FIG. 11 is a schematic diagram depicting a non-limiting example of a beacon system 1100 that includes locator beacons (1102, 1104, 1106) and confiner beacons arranged to confine triggering areas in at least two-dimensions— vertically (y) and horizontally (x). Confiner beacons are depicted arranged generally along the thresholds of the confined triggering areas.

In this example, four horizontal thresholds are defined by confiner beacons. More specifically, first horizontal threshold 1122 is generally defined by confiner beacon 1108b; second horizontal threshold 1124 is generally defined by confiner beacon 1110b; third horizontal threshold 1126 is generally defined by confiner beacon 1112b; and fourth horizontal threshold 1128 is defined by confiner beacon 1114a. As a non-limiting example, each horizontal threshold may be associated with a floor of a building, e.g., a first floor, a second floor, and a third floor, respectively.

Lateral thresholds are also defined by confiner beacons in FIG. 11. More specifically, first lateral boundary 1118 is generally defined by confiner beacon 1112a, confiner beacon 1110a, and confiner beacon 1108a; and second lateral boundary 1120 is generally defined by confiner beacon 1112c, confiner beacon 1108c, and confiner beacon 1110c.

A portable receiver (not shown) may trigger location indications for locations of interest associated with first confined triggering area 1130, second confined triggering area 1132, and third confined triggering area 1134, respectively, in the manner discussed above.

In some cases, a portable receiver may receive a locator signal that, for various reasons (such as signal repeater, signal boosters, or constructive interference, without limitation), has signal characteristics (e.g., RSSI, without limitation) associated with a short distance, but is actually not within a distance threshold. One or more embodiments relate, generally, to discerning such errant locator signals using confiner beacons and confiner signals.

Figure 12:
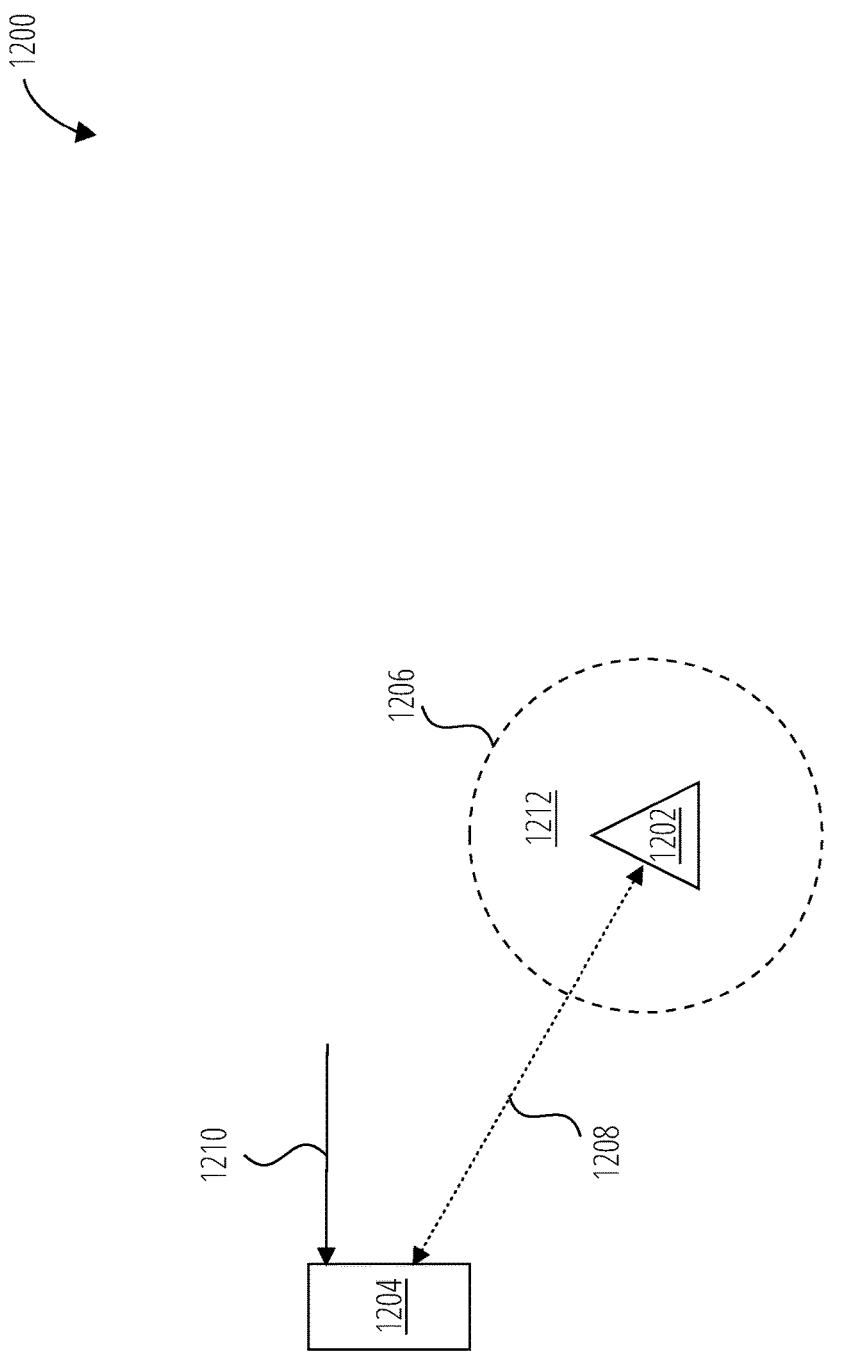
FIG. 12 is a schematic diagram depicting an example beacon system that can be used to resolve errant locator signals, in accordance with one or more embodiments.

FIG. 12 is a schematic diagram depicting an example beacon system 1200 that can be used to resolve errant locator signals. Confined triggering area threshold 1206 is defined by an available triggering threshold of locator beacon 1202 and confiner beacon signals as discussed herein (confiner beacons not depicted by FIG. 12 for convenience). A distance 1208 between portable wireless device 1204 and locator beacon 1202 is beyond the confined triggering area 1212 defined by confined triggering area threshold 1206. Nevertheless, portable wireless device 1204 receives errant locator signal 1210, ostensibly associated with locator beacon 1202 and having signal characteristics (e.g., signal amplitude) that would normally correspond to being within confined triggering area threshold 1206.

To resolve errant locator signal 1210, portable wireless device 1204 localizes a source of errant locator signal 1210 and predicts whether that location is within confined triggering area threshold 1206. A low prediction indicates that, based on the signal characteristics the source of errant locator signal 1210 is outside confined triggering area threshold 1206. So, based on a low prediction, portable wireless device 1204 may discard or ignore errant locator signal 1210 for location indication purposes. In some embodiments, portable wireless device 1204 may include a machine learning model trained to label wireless signals as errant signals responsive to characteristics exhibited by such wireless signals. Additionally or alternatively to signal types and presence, a machine learner such as machine learner 322 may receive errant signal classifications and generate machine learning models trained to predict and label a wireless signal as an errant signal (such as errant locator signal 1210 of FIG. 12). A feature extractor may executing at the wireless device, an operator console, or cloud server may analyze information about characteristics of such wireless signals, attempt to discern relevant features and train machine learning models to label errant locator signals.

Figure 13:
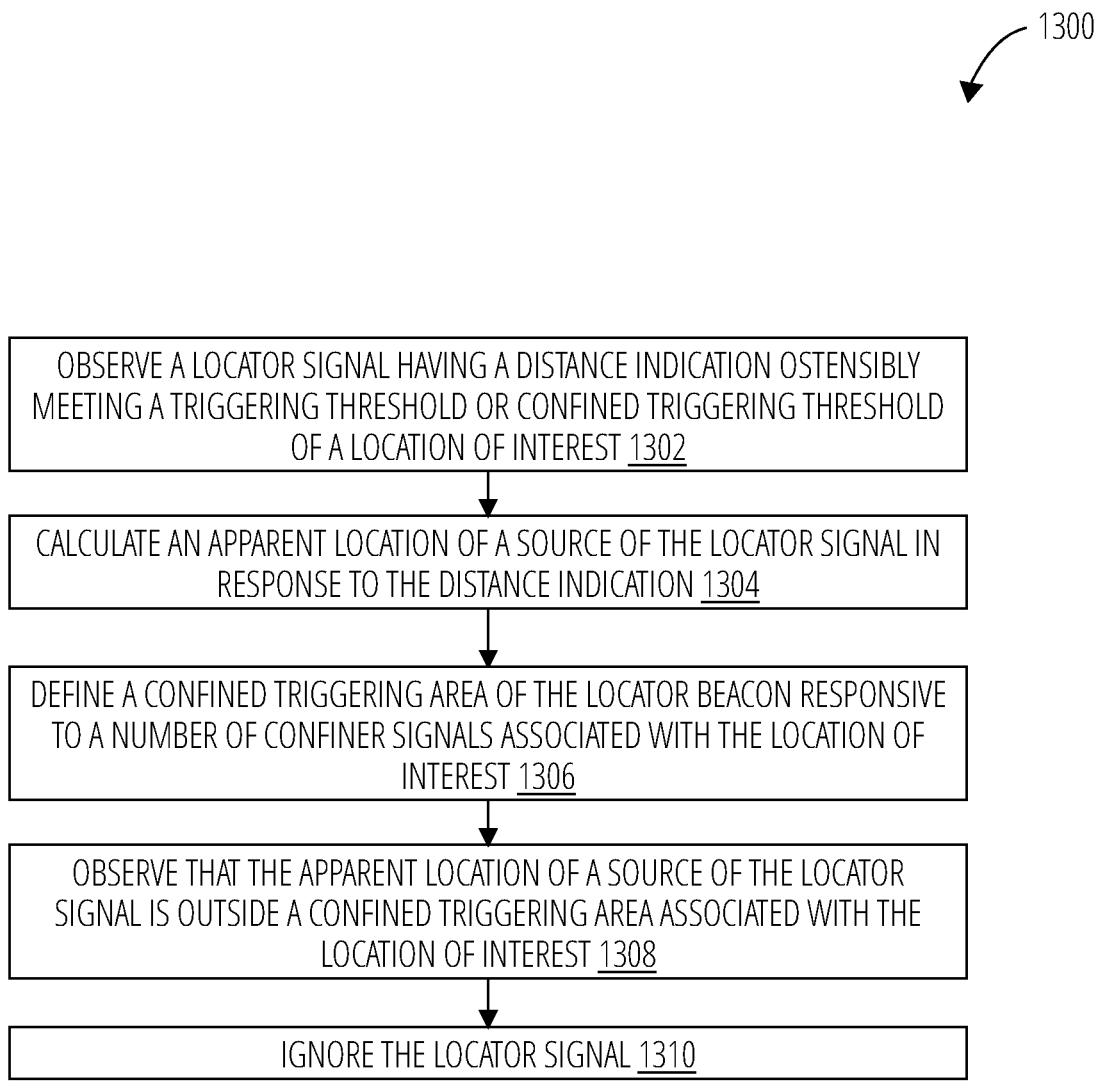
FIG. 13 is a flowchart depicting a process for resolving an errant locator signal, such as errant locator signal of FIG. 12 using confiner signals, in accordance with one or more embodiments.

FIG. 13 is a flowchart depicting a process 1300 for resolving an errant locator signal such as errant locator signal 1210 of FIG. 12 using confiner signals.

At operation 1302, process 1300 observes a locator signal having a distance indication ostensibly meeting a triggering threshold or confined triggering threshold of a location of interest. Stated another way, a distance indication of the locator signal seems to indicate that a portable receiver is within sufficient range of the locator beacon to trigger a location indication of a location of interest associated with the locator beacon.

At operation 1304, process 1300 calculates an apparent location of a source of the locator signal in response the ranging indication.

At operation 1306, process 1300 defines a confined triggering area associated with the location of interest in response to a number of confiner signals.

At operation 1308, process 1300 observes that the apparent location of a source of the locator signal is outside the confined triggering area. In one embodiment, it may be observed that the apparent location is closer than a threshold of a confined triggering area.

At operation 1310, process 1300 ignores the locator signal in response to observing that the apparent location of a source of the locator signal is outside the confined triggering area.

FIGS. 14A, 14B, 14C and 14D are schematic diagrams depicting specific non-limiting example arrangements of beacons that form confined triggering areas in 2D and 3D space, in accordance with one or more embodiments. In each case, a confined triggering space is defined by the available triggering area/space of a locator beacon and the confining area/space of the confiner beacons.

Figure 14A:
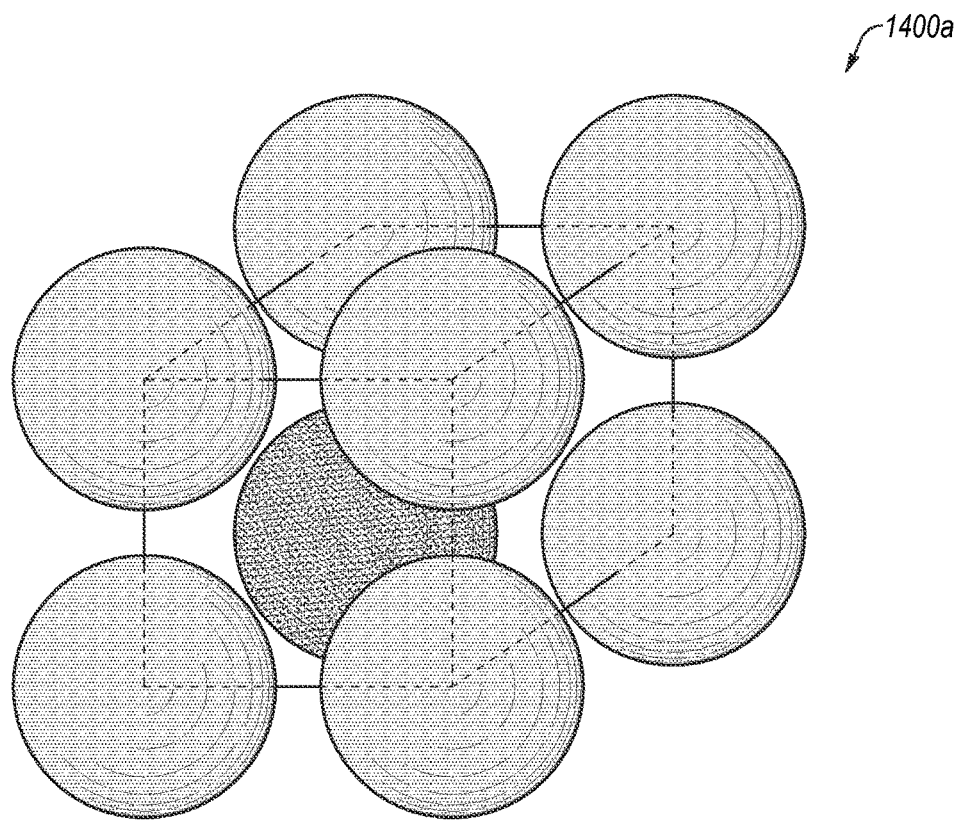
FIGS. 14A to 14D are schematic diagrams of example arrangements of beacon systems, in accordance with one or more embodiments.
Figure 14B:
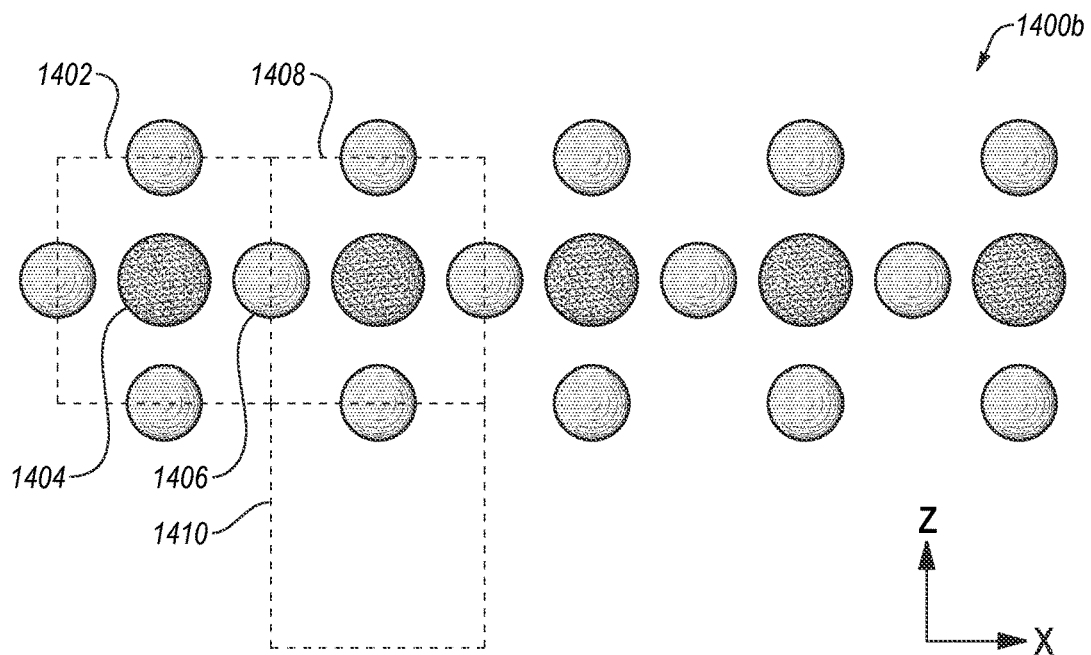

FIG. 14A depicts an arrangement 1400*a* including a locator beacon encased in a body-centric cube triggering area defined by confiner beacons (here, eight confiner beacons). FIG. 14B depicts an arrangement 1400b where a number of adjacent "cells" are defined, the respective cells consisting of four confiner beacons and a locator beacon at the center that together define a confined triggering space—e.g., confined triggering space of cell 1402 including locator beacon 1404. Two cells of arrangement 1400*b* are labeled, cell 1402 and cell 1408, share a common confiner beacon 1406. In various embodiments, FIG. 14B may be a cross-sectional view in x-z plane of an arrangement 1400*c* of adjacent cells in 3D space, or an arrangement 1400*c* of adjacent cells in 2D space.

Additional 2D or 3D "cells" may be itterated into (deployed adjacent) to the larger system in 2D or 3D space. For example, a new cell may be deployed adjacent to cell 1408 at space 1410. Arrangement 1400*b* may be extended in 2D space by positioning three confiner beacons and a locator beacon similar to the other confiner beacons in arrangement 1400*b* (or differently if a different shape is desired) and then a localiziton unit, receiver, or beacon management system configured with identifiers, type information, and affiliation with a location and/or locator beacon.

Figure 14C:
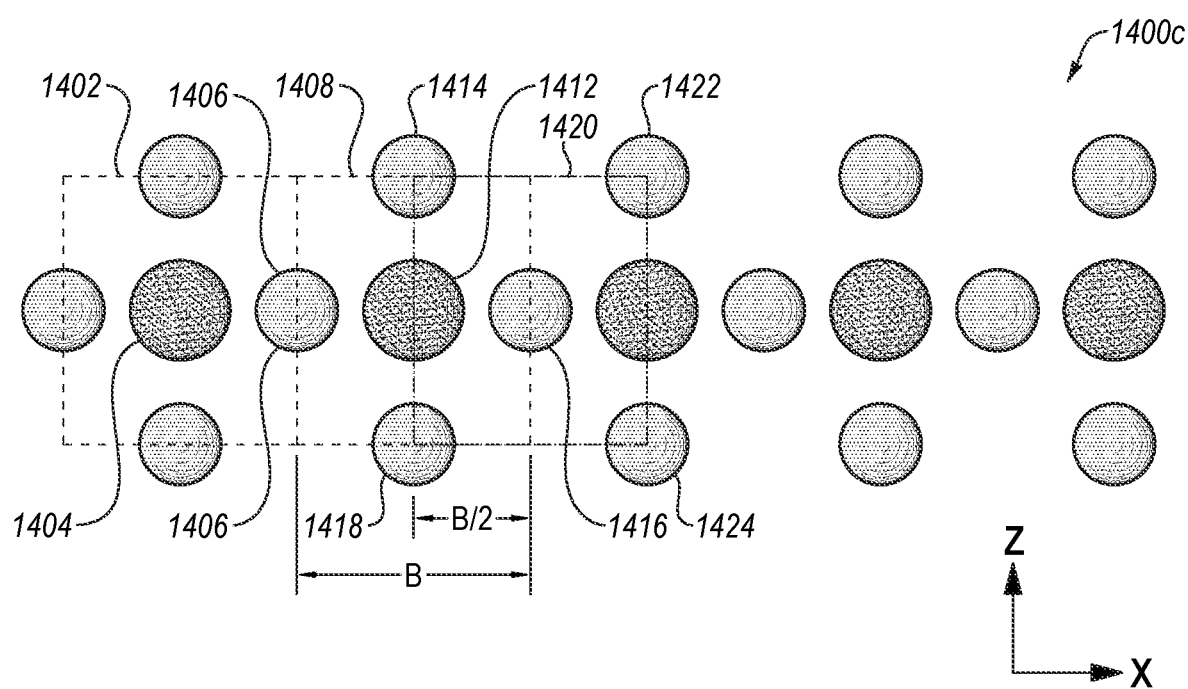
Figure 14D:
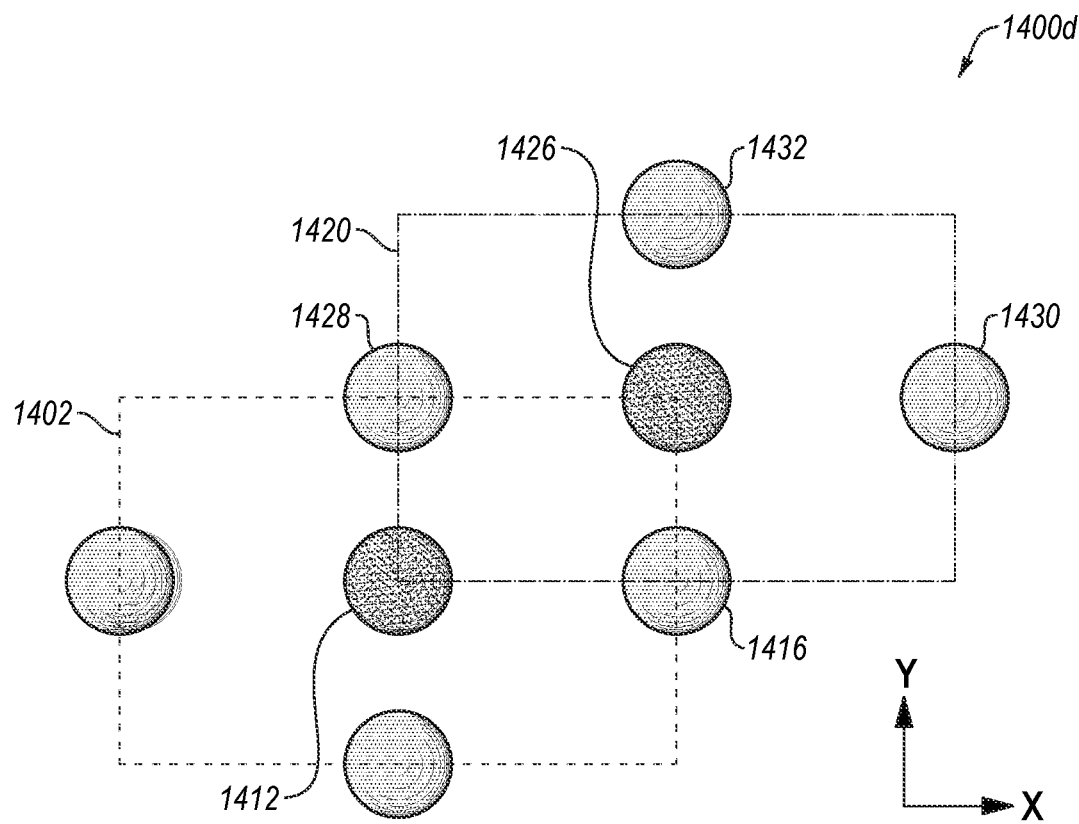

In the case of itterating into a larger system in 3D space, FIG. 14C and 14D depict cross-sectional views of a specific non-limiting example of an extension of arrangement 1400*b* in 3D space to add new cell 1420, which is partially adjacent to existing cell 1408. FIG. 14C depicts an x-z cross-section of an arrangement portion 1400*c* where new cell 1420 is arranged above (in a y-direction as depicted by FIG. 14D) in 3D space and spaced in the x-direction by a distance B/2 (in various examples, B being a distance from a center point to center point of confining spaces of confiner beacons). Existing confiner beacons 1414, 1416, 1418, 1422, and 1424 define a portion of the new cell 1420 along the x-z plane as depicted.

FIG. 14D depicts an x-y cross-section of an arrangement portion 1400*d* that corresponds to arrangement portion 1400*c*. For example, new cell 1420 including new locator beacon 1426 is defined by positioning a new confiner beacon 1416 on a same plane as existing confiner beacon 1428 (alternatively a new confiner beacon 1414 if locator beacon 1404 was not previously defined in a y-direction) and new confiner beacon 1432 on a plane above and parallel the plane of confiner beacons 1428 and 1430 (spaced by a distance B/2 in the y-direction). New cell 1420 is defined (at least in the y-direction) by existing confiner beacons 1416 and 1428 and new confiner beacons 1432 and 1430. Once beacons are positioned and localization unit, receiver, or beacon management system is configured as discussed herein, new cell 1420 is defined 3D space.

In some cases, prior to extension of the arrangement, new locator beacon 1426 may have been a confiner beacon of cell 1408 that, when setting up new cell 1420, is associated with a locator beacon of new cell 1420. Moreover, locator beacon 1412 of cell 1408 may be associated with cell 1420 as a confiner beacon. So, extending arrangements by adding adjacent cells may include positioning and activating new beacons as well as associating existing beacons with confining or locating, as the case may be.

Notably, logic for determinations discussed herein may be performed remote from the respective antennas that transmit and receive wireless signals in accordance with disclosed embodiments. As a non-limiting example, wireless signals may be received at an antenna in a wearable device (e.g., a smart watch or a tracker, without limitation). The wearable device may relay the signals with RSSI or in a manner that preserves RSSI in the signals to a smart phone (e.g., via Bluetooth or NFC, without limitation) or to a cloud server (e.g., via a Wi-Fi network, without limitation) that processes the signal, determines presence as discussed herein, and communicates presence to wearable device or a user's smart phone to generate a notification.

Notably, determination of presence inside/outside a confined triggering area may be performed anywhere in a beacon system. In one or more embodiments, an ambulatory transmitter may send locator signals (for informing receivers, "I'm here!") and stationary receivers, confiner and locator, that receive the locator signals may calculate distance indications and share the indications with a master unit, the device having the ambulatory transmitter, a control station or even a cloud server. The locator and confiner distance indications may be combined to detect presence of the ambulatory transmitter inside or outside a confined triggering area. A presence indication may be sent to the ambulatory transmitter and a location indication triggered, or not, in response to the presence indication.

Due to radially broadcast locator and confiner signals, substantially circular/spherical shaped triggering areas and variations thereon are convenient, but other shapes do not exceed the scope of this disclosure. Defining arbitrarily shaped triggering areas—as non-limiting examples, using confiner beacons/signals, unaffiliated locator beacons/signals, differently affiliated locator beacons/signals, obstructions (e.g., walls, without limitation), and combinations thereof—is specifically contemplated.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub combinations of some of the elements. For example, the phrase "A, B, C, D, or combinations thereof" may refer to any one of A, B, C, or D; the combination of each of A, B, C, and D; and any sub combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.). As used herein, "each" means some or a totality. As used herein, "each and every" means a totality.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Examples of non-limiting embodiments of the disclosure include:

Embodiment 1: a device, comprising: a communication equipment configured to receive wireless signals; and a localization unit configured to: associate one or more locator signals and one or more confiner signals with a three-dimensional (3D) space of interest; define a boundary of the 3D space of interest at least partially responsive to the one or more confiner signals; suppress a location indication at least partially responsive to observing an indication of a presence of the device outside the 3D space of interest; and initiate the location indication at least partially responsive to observing an indication of the presence of the device within the 3D space of interest.

Embodiment 2: the device according to Embodiment 1, wherein the localization unit is configured to: define an available triggering 3D space associated with the 3D space of interest at least partially responsive to the one or more locator signals; and define a confined 3D space associated with the 3D space of interest at least partially responsive to the one or more confiner signals.

Embodiment 3: the device according to any of Embodiments 1 and 2, wherein the localization unit is configured to: compare distance indications of the one or more locator signals and one or more confiner signals; and obtain, responsive to the comparison, the indication of the presence of the device outside the 3D space or the indication of the presence of the device within the 3D space.

Embodiment 4: the device according to any of Embodiments 1 to 3, wherein the distance indications comprise signal measurements that change in a generally increasing manner as the device draws closer to respective beacons of the one or more locator signals and the one or more confiner signals and change in a generally decreasing manner as the device draws away from the respective beacons of the one or more locator signals and the one or more confiner signals.

Embodiment 5: the device according to any of Embodiments 1 to 4, wherein the localization unit is configured to: trigger the location indication responsive to observing an indication that a distance indication of a locator signal meets or exceeds a triggering threshold.

Embodiment 6: the device according to any of Embodiments 1 to 5, wherein the wireless signals comprise signals carried by acoustic or electromagnetic radiation.

Embodiment 7: the device according to any of Embodiments 1 to 6, wherein the signals carried by acoustic or electromagnetic radiation comprise one or more of: radio signals, microwave signals, optical signals, acoustic signals, sonic signals, and electromagnetic induction signals.

Embodiment 8: the device according to any of Embodiments 1 to 7, wherein the 3D space of interest is: a room of a building, a floor of a building, a portal of a building, a portal of a room of a building.

Embodiment 9: the device according to any of Embodiments 1 to 8, wherein the localization unit is configured to: observe patterns exhibited by locator signals and confiner signals respectively associated with multiple 3D space of interests; and detect movement: from a first one of the 3D spaces of interest to a second one of the 3D spaces of interest; or from a first floor to a second floor.

Embodiment 10: the device according to any of Embodiments 1 to 9, wherein the localization unit is configured to: observe patterns exhibited by locator signals and confiner signals respectively associated with multiple 3D space of interests; and detect a presence of the device on a floor of a building.

Embodiment 11: a localization method, comprising: associating one or more locator signals and one or more confiner signals with a three-dimensional (3D) space of interest; defining a boundary of the 3D space of interest responsive to one or more confiner signals; suppressing a location indication responsive to observing a presence of a receiver outside the 3D space of interest; and triggering the location indication responsive to observing the presence of the receiver within the 3D space of interest.

Embodiment 12: the method according to Embodiment 11, further comprising: defining an available triggering area associated with the 3D space of interest responsive to the one or more locator signals; and defining a confined triggering area associated with the 3D space of interest responsive to the one or more confined signals.

Embodiment 13: the method according to any of Embodiments 11 and 12, further comprising: comparing distance indications of the one or more locator signals and one or more confiner signals; and observing, responsive to the comparison, the presence of the receiver outside the boundary of the 3D space of interest or the presence of the receiver within the boundary of the 3D space of interest.

Embodiment 14: the method according to any of Embodiments 11 to 13, wherein the distance indications are indicating an apparent distance between a receiver and respective beacons of the one or more locator signals and the one or more confiner signals.

Embodiment 15: the method according to any of Embodiments 11 to 14, wherein the distance indications comprising signal measurements that change in a generally increasing manner as the receiver draws closer to respective beacons of the one or more locator signals and the one or more confiner signals and that change in a generally decreasing manner as the receiver draws away from the respective beacons of the one or more locator signals and the one or more confiner signals.

Embodiment 16: the method according to any of Embodiments 11 to 15, comprising initiating triggering of the location indication responsive to observing a distance indication of a locator signal meets or exceeds a triggering threshold.

Embodiment 17: the method according to any of Embodiments 11 to 16, comprising receiving wireless signals comprising locator signals and confiner signals.

Embodiment 18: the method according to any of Embodiments 11 to 17, wherein receiving the wireless signals comprises receiving signals carried by acoustic or electromagnetic radiation.

Embodiment 19: the method according to any of Embodiments 11 to 18, wherein receiving the wireless signals carried by acoustic or electromagnetic radiation comprises receiving one or more of: radio signals, microwave signals, optical signals, acoustic signals, sonic signals, and electromagnetic induction signals.

Embodiment 20: the method according to any of Embodiments 11 to 19, wherein the 3D space of interest is: a room of a building, a floor of a building, a portal of a building, a portal of a room of a building.

Embodiment 21: the method according to any of Embodiments 11 to 20, comprising: observing patterns exhibited by locator signals and confiner signals respectively associated with multiple 3D space of interests; and detecting movement: from a first one of the 3D spaces of interest to a second one of the 3D spaces of interest; or from a first floor to a second floor.

Embodiment 22: the method according to any of Embodiments 11 to 21, wherein the localization unit is configured to: observing patterns exhibited by locator signals and confiner signals respectively associated with multiple 3D space of interests; and detecting a presence of the device on a floor of a building.

Embodiment 23: a wireless beacon system, comprising: a first wireless transmitter configured to generate wireless signals indicative of a three-dimensional (3D) space of interest; and second wireless transmitters configured to generate wireless signals indicative of 3D spaces not-of-interest, wherein the first wireless transmitter is arranged at a first location within a desired boundary defining the 3D space of interest, and wherein the second wireless transmitters are arranged at second locations selected outside the desired boundary defining the 3D space of interest such that respective desired boundaries defining the 3D spaces not-of-interest at least partially define the desired boundary of the 3D space of interest.

Embodiment 24: the wireless beacon system according to Embodiment 23, wherein at least some of the second wireless transmitters are arranged at locations of the second locations on different planes that have respective surfaces substantially parallel to the ground.

Embodiment 25: the wireless beacon system according to any of Embodiments 23 and 24, wherein first and second planes of the different planes at least partially define the 3D space of interest.

Embodiment 26: the wireless beacon system according to any of Embodiments 23 to 25, wherein the first wireless transmitter and the second wireless transmitters are configured to generate wireless signals exhibiting a measurable characteristic that is expected to change in a generally decreasing manner as a distance increases between respective locations at which one of the wireless signals is generated and received.

Embodiment 27: the wireless beacon system according to any of Embodiments 23 to 26, wherein at least some of the second locations where the second wireless transmitters are arranged are on, in, or near room partitions.

Embodiment 28: the wireless beacon system according to any of Embodiments 23 to 27, wherein at least some of the second locations where the second wireless transmitters are arranged are on, in, or near floor partitions.

Embodiment 29: the wireless beacon system according to any of Embodiments 23 to 28, wherein at least some of the second locations where the second wireless transmitters are arranged are on, in, or near entry or exit portals for a room or a building.

Embodiment 30: the wireless beacon system according to any of Embodiments 23 to 29, wherein changing patterns exhibited by the wireless signals generated by the first wireless transmitter and the second wireless transmitters indicate movement from the 3D space of interest to another 3D space of interest.

Embodiment 31: the wireless beacon system according to any of Embodiments 23 to 30, wherein patterns exhibited by the wireless signals generated by the first wireless transmitter and the second wireless transmitters indicate movement: (i) from the 3D space of interest to another 3D space of interest; or (ii) movement from a first floor to a second floor.

Embodiment 32: the wireless beacon system according to any of Embodiments 23 to 31, wherein patterns exhibited by the wireless signals generated by the first wireless transmitter and the second wireless transmitters indicate a presence of the device on a floor of a building.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A device, comprising:
  a communication equipment configured to receive wireless signals; and
  a localization unit configured to:
    associate one or more locator signals and one or more confiner signals with a three-dimensional (3D) space of interest;
    define a boundary of the 3D space of interest at least partially responsive to the one or more confiner signals;
    suppress a location indication at least partially responsive to observing an indication of a presence of the device outside the 3D space of interest; and
    initiate the location indication at least partially responsive to observing an indication of the presence of the device within the 3D space of interest.

2. The device of claim 1, wherein the localization unit is configured to:
  define an available triggering 3D space associated with the 3D space of interest at least partially responsive to the one or more locator signals; and
  define a confined 3D space associated with the 3D space of interest at least partially responsive to the one or more confiner signals.

3. The device of claim 1, wherein the localization unit is configured to:
  compare distance indications of the one or more locator signals and the one or more confiner signals; and
  obtain, responsive to the comparison, the indication of the presence of the device outside the 3D space or the indication of the presence of the device within the 3D space.

4. The device of claim 3, wherein the distance indications comprise signal measurements that change in a generally increasing manner as the device draws closer to respective beacons of the one or more locator signals and the one or more confiner signals and change in a generally decreasing manner as the device draws away from the respective beacons of the one or more locator signals and the one or more confiner signals.

5. The device of claim 1, wherein the localization unit is configured to:
  trigger the location indication responsive to observing an indication that a distance indication of a locator signal meets or exceeds a triggering threshold.

6. The device of claim 1, wherein the wireless signals comprise signals carried by acoustic or electromagnetic radiation.

7. The device of claim 6, wherein the signals carried by acoustic or electromagnetic radiation comprise one or more of: radio signals, microwave signals, optical signals, acoustic signals, sonic signals, and electromagnetic induction signals.

8. The device of claim 1, wherein the 3D space of interest is: a room of a building, a floor of a building, a portal of a building, a portal of a room of a building.

9. The device of claim 1, wherein the localization unit is configured to:
  observe patterns exhibited by locator signals and confiner signals respectively associated with multiple 3D space of interests; and
  detect movement:
    from a first one of the 3D spaces of interest to a second one of the 3D spaces of interest; or
    from a first floor to a second floor.

10. The device of claim 1, wherein the localization unit is configured to:
  observe patterns exhibited by locator signals and confiner signals respectively associated with multiple 3D space of interests; and
  detect a presence of the device on a floor of a building.

11. A localization method, comprising:
  associating one or more locator signals and one or more confiner signals with a three-dimensional (3D) space of interest;
  defining a boundary of the 3D space of interest responsive to the one or more confiner signals;
  suppressing a location indication responsive to observing a presence of a receiver outside the 3D space of interest; and
  triggering the location indication responsive to observing the presence of the receiver within the 3D space of interest.

12. The method of claim 11, further comprising:
  defining an available triggering area associated with the 3D space of interest responsive to the one or more locator signals; and
  defining a confined triggering area associated with the 3D space of interest responsive to the one or more confiner signals.

13. The method of claim 12, further comprising:
comparing distance indications of the one or more locator signals and the one or more confiner signals; and
observing, responsive to the comparison, the presence of the receiver outside the boundary of the 3D space of interest or the presence of the receiver within the boundary of the 3D space of interest.

14. The method of claim 13, wherein the distance indications are indicating an apparent distance between the receiver and respective beacons of the one or more locator signals and the one or more confiner signals.

15. The method of claim 14, wherein the distance indications comprising signal measurements that change in a generally increasing manner as the receiver draws closer to respective beacons of the one or more locator signals and the one or more confiner signals and that change in a generally decreasing manner as the receiver draws away from the respective beacons of the one or more locator signals and the one or more confiner signals.

16. The method of claim 11, comprising initiating triggering of the location indication responsive to observing a distance indication of a locator signal meets or exceeds a triggering threshold.

17. The method of claim 11, comprising receiving wireless signals comprising locator signals and confiner signals.

18. The method of claim 17, wherein receiving the wireless signals comprises receiving signals carried by acoustic or electromagnetic radiation.

19. The method of claim 18, wherein receiving the wireless signals carried by acoustic or electromagnetic radiation comprises receiving one or more of: radio signals, microwave signals, optical signals, acoustic signals, sonic signals, and electromagnetic induction signals.

20. The method of claim 11, wherein the 3D space of interest is: a room of a building, a floor of a building, a portal of a building, a portal of a room of a building.

21. The method of claim 11, comprising:
observing patterns exhibited by locator signals and confiner signals respectively associated with multiple 3D space of interests; and
detecting movement:
from a first one of the 3D spaces of interest to a second one of the 3D spaces of interest; or from a first floor to a second floor.

22. The method of claim 11, wherein a localization unit is configured to:
observe patterns exhibited by locator signals and confiner signals respectively associated with multiple 3D space of interests; and
detect a presence of a device on a floor of a building.

23. A wireless beacon system, comprising:
a first wireless transmitter configured to generate wireless signals indicative of a three-dimensional (3D) space of interest; and
second wireless transmitters configured to generate wireless signals indicative of 3D spaces not-of-interest,
wherein the first wireless transmitter is arranged at a first location within a desired boundary defining the 3D space of interest, and
wherein the second wireless transmitters are arranged at second locations selected outside the desired boundary defining the 3D space of interest such that respective desired boundaries defining the 3D spaces not-of-interest at least partially define the desired boundary of the 3D space of interest.

24. The wireless beacon system of claim 23, wherein at least some of the second wireless transmitters are arranged at locations of the second locations on different planes that have respective surfaces substantially parallel to the ground.

25. The wireless beacon system of claim 24, wherein first and second planes of the different planes at least partially define the 3D space of interest.

26. The wireless beacon system of claim 23, wherein the first wireless transmitter and the second wireless transmitters are configured to generate wireless signals exhibiting a measurable characteristic that is expected to change in a generally decreasing manner as a distance increases between respective locations at which one of the wireless signals is generated and received.

27. The wireless beacon system of claim 23, wherein at least some of the second locations where the second wireless transmitters are arranged are on, in, or near room partitions.

28. The wireless beacon system of claim 23, wherein at least some of the second locations where the second wireless transmitters are arranged are on, in, or near floor partitions.

29. The wireless beacon system of claim 23, wherein at least some of the second locations where the second wireless transmitters are arranged are on, in, or near entry or exit portals for a room or a building.

30. The wireless beacon system of claim 23, wherein changing patterns exhibited by the wireless signals generated by the first wireless transmitter and the second wireless transmitters indicate movement from the 3D space of interest to another 3D space of interest.

31. The wireless beacon system of claim 23, wherein patterns exhibited by the wireless signals generated by the first wireless transmitter and the second wireless transmitters indicate movement: (i) from the 3D space of interest to another 3D space of interest; or (ii) movement from a first floor to a second floor.

32. The wireless beacon system of claim 23, wherein patterns exhibited by the wireless signals generated by the first wireless transmitter and the second wireless transmitters indicate a presence of a device on a floor of a building.

* * * * *

UNITED STATES PATENT AND TRADEMARK OFFICE
CERTIFICATE OF CORRECTION

PATENT NO. : 11,681,004 B2
APPLICATION NO. : 17/206984
DATED : June 20, 2023
INVENTOR(S) : Lance Glasser It is certified that error appears in the above-identified patent and that said Letters Patent is hereby corrected as shown below:

In the Specification

| | | |
|---|---|---|
| Column 4, | Line 28, | change "two-dimensions—horizontally" to --two-dimensions - horizontally-- |
| Column 6, | Line 65, | change "be used—such as" to --be used - such as-- |
| Column 6, | Line 66, | change "limitation—that" to --limitation - that-- |
| Column 7, | Lines 62-63, | change "distance—intentional" to --distance - intentional-- |
| Column 8, | Lines 34-35, | change "radiation—such as" to --radiation - such as-- |
| Column 14, | Lines 37-38, | change "two-dimensions—vertically" to --two-dimensions - vertically-- |
| Column 16, | Lines 11-12, | change "space—e.g., confined" to --space - e.g., confined-- |
| Column 17, | Line 31, | change "areas—as non-limiting" to --areas - as non-limiting-- |
| Column 17, | Line 35, | change "thereof—is specifically" to --thereof - is specifically-- |

Signed and Sealed this
Fifteenth Day of October, 2024

Katherine Kelly Vidal
*Director of the United States Patent and Trademark Office*